United States Patent
Shinkai et al.

(10) Patent No.: US 8,224,154 B2
(45) Date of Patent: Jul. 17, 2012

(54) RECORDING CONTROL DEVICE AND METHOD, PROGRAM, AND RECORDING MEDIUM

(75) Inventors: Mitsutoshi Shinkai, Kanagawa (JP); Hirofumi Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1447 days.

(21) Appl. No.: 10/516,678

(22) PCT Filed: Apr. 2, 2004

(86) PCT No.: PCT/JP2004/004877
§ 371 (c)(1),
(2), (4) Date: Dec. 3, 2004

(87) PCT Pub. No.: WO2004/090887
PCT Pub. Date: Oct. 21, 2004

(65) Prior Publication Data
US 2006/0120239 A1    Jun. 8, 2006

(30) Foreign Application Priority Data

Apr. 4, 2003   (JP) .............................. P2003-101119

(51) Int. Cl.
*H04N 9/80* (2006.01)
(52) U.S. Cl. .................. 386/248; 386/239; 386/242
(58) Field of Classification Search ............. 386/69, 386/125, 126, 239–248, 326–341; 345/473
See application file for complete search history.

(56) References Cited

U.S. PATENT DOCUMENTS

| | | | |
|---|---|---|---|
| 5,206,850 A * | 4/1993 | Tezuka et al. | 369/47.31 |
| 2002/0131763 A1* | 9/2002 | David | 386/69 |
| 2003/0054128 A1 | 3/2003 | Sako et al. | |
| 2003/0146915 A1* | 8/2003 | Brook et al. | 345/473 |

FOREIGN PATENT DOCUMENTS

| | | |
|---|---|---|
| EP | 1 098 522 | 5/2001 |
| EP | 1 102 271 | 5/2001 |
| EP | 1 102 276 | 5/2001 |
| EP | 1 102 277 | 5/2001 |
| EP | 1 102 493 | 5/2001 |

(Continued)

*Primary Examiner* — Thai Tran
*Assistant Examiner* — Hung Dang
(74) *Attorney, Agent, or Firm* — Frommer Lawrence & Haug LLP; William S. Frommer; Ellen Marcie Emas

(57) ABSTRACT

The present invention relates to a recording control apparatus and a recording control method which can improve the convenience of a storage medium and also to a program and a storage medium. Image annulus data or audio annulus data having a first data amount in accordance with a data amount required for reproduction for first reproduction time and low-resolution annulus data or frame-meta annulus data having a second data amount in accordance with a data amount required for reproduction for a second reproduction time that is different from the first reproduction time are recorded on an optical disk so that the data are periodically arranged. The image annulus data or the audio annulus data is extracted from a data series of corresponding video data or audio data. The low-resolution annulus data or the frame-meta annulus data is extracted from a data series of low-resolution video data having a less data amount or a series of frame metadata. Clip metadata generated in accordance with the frame metadata is recorded at random independently of those data. The present invention is applicable to a disk drive apparatus.

10 Claims, 16 Drawing Sheets

FOREIGN PATENT DOCUMENTS

| | | |
|---|---|---|
| EP | 1 130 594 | 9/2001 |
| EP | 1 278 371 | 1/2003 |
| EP | 1 357 554 | 10/2003 |
| JP | 2001-189940 | 7/2001 |
| JP | 2001-333379 | 11/2001 |
| JP | 2003-78872 | 3/2003 |

* cited by examiner

CLIP-META ANNULUS DATA

CLIP-META ANNULUS DATA

CLIP-META ANNULUS DATA

CLIP-META ANNULUS DATA

RECORDING CONTROL DEVICE AND METHOD, PROGRAM, AND RECORDING MEDIUM

TECHNICAL FIELD

The present invention relates to recording control apparatuses and recording control methods, programs, and storage media, and, more particularly, relates to a recording control apparatus and a recording control method which can, for example, improve the convenience of a storage medium and also to a program and a storage medium.

BACKGROUND ART

Conventionally, audio data and video data have been recorded in one sector, which is a physical record/reproduction unit formed on a storage medium such as an optical disk, in a mixed manner. In the conventional recording method, however, since audio data and video data are arranged in a free space in a sector in a discrete manner, there is difficulty in achieving high-speed reproduction when predetermined audio data is reproduced. This is because other video data arranged in the same sector is wastefully read.

Accordingly, for example, recording audio data and video data in respective areas, obtained by concentrically dividing a recording area of an optical disk, with a certain degree of continuity allows for high-speed reproduction.

Further, recording metadata for audio data and video data at the same time can facilitate desired data to be located.

However, when desired data is retrieved based on metadata recorded in individual areas, a system for sequentially performing reading from the front end has a problem in that the retrieval time is slow.

DISCLOSURE OF INVENTION

The present invention has been made in view of the foregoing situation, and is intended to allow for an improvement in the convenience of a storage medium, such as allowing for high-speed reproduction and high-speed retrieval.

A recording control apparatus of the present invention is characterized by including first data extracting means, second data extracting means, first recording-control means, and second recording-control means. The first data extracting means extracts data having a first data amount, which is a data amount in accordance with a data amount required for reproduction for first reproduction time, from a first data series. The second data extracting means extracts data having a second data amount, which is a data amount in accordance with a data amount required for reproduction for second reproduction time that is different from the first reproduction time, from a second data series. The first recording-control means performs recording-control to record data having the first data amount for the first data series and data having the second data amount for the second data series onto a storage medium so that the respective data are periodically arranged. The second recording-control means performs recording-control to record a third data series onto the storage medium so that the third data series is arranged at random independently of the first data series and the second data series.

The first data amount may be a data amount that is an integral multiple of a data amount in a physical unit area of the storage medium and that is close to a data amount required for reproduction for the first reproduction time. The second data amount may be a data amount that is an integral multiple of a data amount in the physical unit area of the storage medium and that is close to a data amount required for reproduction for the second reproduction time.

With respect to the storage medium, the physical unit area may be a minimum area to/from which data writing/reading is performed or an area in which an ECC block on which ECC processing is performed is recorded.

The first recording-control means may cause the data having the first data amount for the first data series and the data having the second data amount for the second data series to be recorded onto the storage medium so that boundaries of the respective data match boundaries of physical unit areas of the storage medium.

With respect to the storage medium, the physical unit area may be a minimum area to/from which data writing/reading is performed or an area in which an ECC block on which ECC processing is performed is recorded.

The first data series may be a data series of video or a data series of audio associated with the video. The second data series may be a data series of metadata that requires a real-time characteristic for the data series of video or the data series of audio associated with the video. The third data series may be a data series of metadata that does not require a real-time characteristic for the data series of video or the data series of audio associated with the video.

For each clip that constitutes material data in a predetermined area in the first data series, the third data series may use one file containing one of at least an LTC/UMID, GPS data, front-end time code, discontinuous-point time code information, a front-end extended UMID source pack, and a discontinuous-point extended UMID source pack.

A recording control method according to the present invention is characterized by including a first extracting step, a second data extracting step, a first recording-control step, and a second recording-control step. The first extracting step extracts data having a first data amount, which is a data amount in accordance with a data amount required for reproduction for first reproduction time, from a first data series. The second data extracting step extracts data having a second data amount, which is a data amount in accordance with a data amount required for reproduction for second reproduction time that is different from the first reproduction time, from a second data series. The first recording-control step performs recording-control to record data having the first data amount for the first data series and data having the second data amount for the second data series onto a storage medium so that the respective data are periodically arranged. The second recording-control step performs recording-control to record a third data series onto the storage medium so that the third data series is arranged at random independently of the first data series and the second data series.

A program according to the present invention is characterized by causing a computer to execute a first extracting step, a second data extracting step, a first recording-control step, and a second recording-control step. The first extracting step extracts data having a first data amount, which is a data amount in accordance with a data amount required for reproduction for first reproduction time, from a first data series. The second data extracting step extracts data having a second data amount, which is a data amount in accordance with a data amount required for reproduction for second reproduction time that is different from the first reproduction time, from a second data series. The first recording-control step performs recording-control to record data having the first data amount for the first data series and data having the second data amount for the second data series onto a storage medium so that the respective data are periodically arranged. The second recording-control step performs recording-control to record a third data series onto the storage medium so that the third data series is arranged at random independently of the first data series and the second data series.

A storage medium according to the present invention is characterized in that data which is extracted from the first data series and which has a first data amount that is a data amount in accordance with a data amount required for reproduction for first reproduction time and data which is extracted from the second data series and which has a second data amount that is a data amount in accordance with a data amount required for reproduction for second reproduction time that is different from the first reproduction time are recorded so that the respective data are periodically arranged, and the third data series is arranged at random independently of the first data series and the second data series.

In the present invention, data having a first data amount, which is a data amount in accordance with a data amount required for reproduction for first reproduction time, is extracted from a first data series. Data having a second data amount, which is a data amount in accordance with a data amount required for reproduction for second reproduction time that is different from the first reproduction time, is extracted from a second data series. Data having the first data amount for the first data series and data having the second data amount for the second data series are recorded onto a storage medium so that the respective data are periodically arranged. Further, a third data series is recorded onto the storage medium so that the third data series is arranged at random independently of the first data series and the second data series.

BEST MODE FOR CARRYING OUT THE INVENTION

Figure 1:
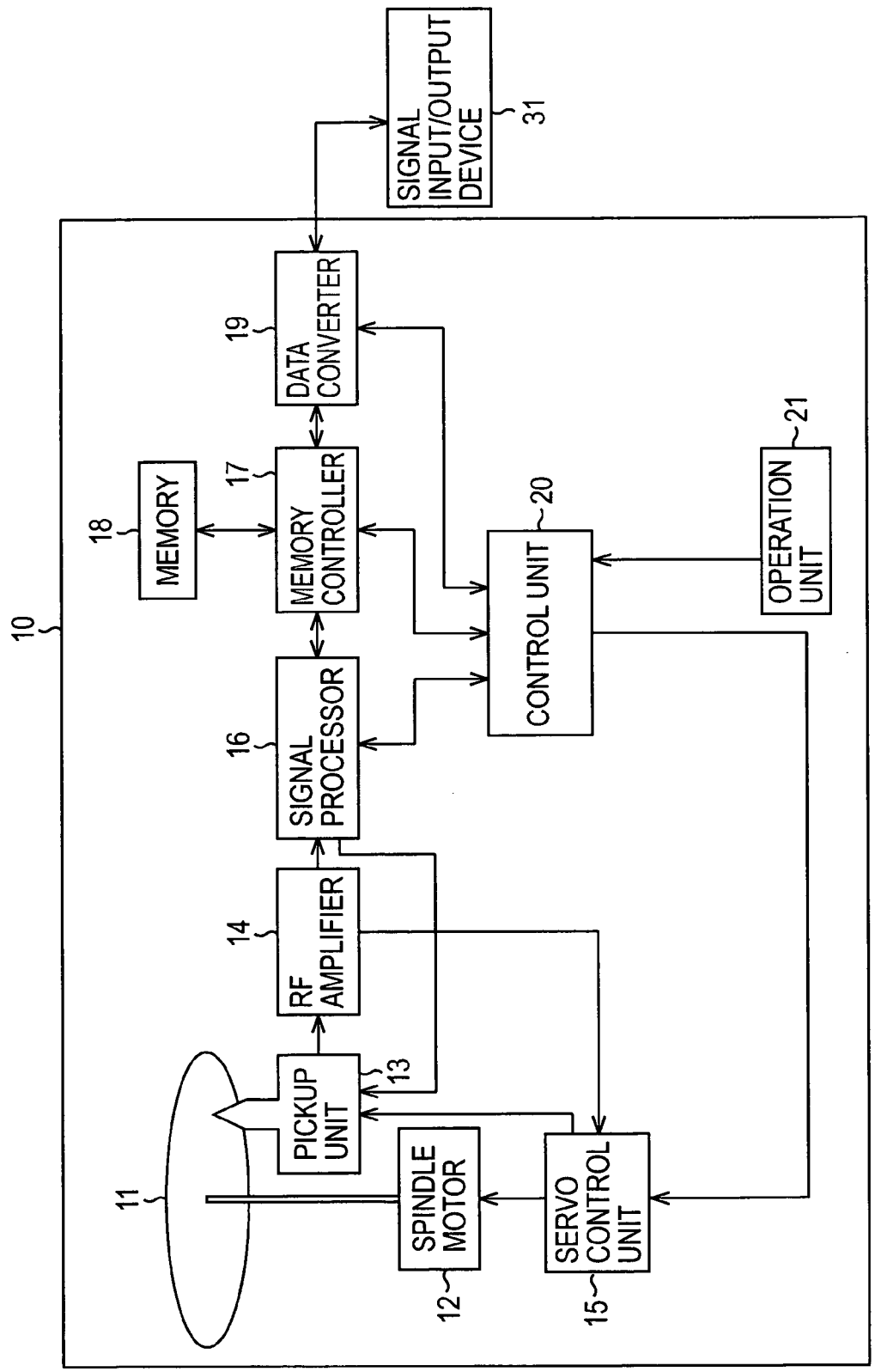
FIG. 1 is a block diagram showing an exemplary configuration of a recording/reproducing apparatus according to the present invention.

FIG. 1 is a block diagram showing an exemplary configuration of one embodiment of a disk recording/reproducing apparatus (disk apparatus) 10 according to the present invention.

A spindle motor 12 rotates and drives an optical disk 11 at a CLV (constant linear velocity) or a CAV (constant angular velocity) in accordance with a spindle-motor drive signal supplied from a servo control unit 15.

A pickup unit 13 controls an output of laser light in accordance with a recording signal supplied from a signal processor 16 to record the recording signal onto the optical disk 11. The pickup unit 13 also focuses the laser light onto the optical disk 11 to illuminate the optical disk 11 photoelectrically converts light reflected from the optical disk 11 into an electrical signal, and supplies the electrical signal to an RF (radio frequency) amplifier 14. The illumination position of the laser light is controlled to a predetermined position in accordance with a servo signal supplied from the servo control unit 15 to the pickup unit 13.

In accordance with the electrical signal supplied from the pickup unit 13, the RF amplifier 14 generates a focus error signal, a tracking error signal, and a reproduction signal. The RF amplifier 14 then supplies the tracking error signal and the focus error signal to the servo control unit 15 and supplies the reproduction signal to the signal processor 16.

The servo control unit 15 controls a focus servo operation and a tracking servo operation. Specifically, in accordance with the focus error signal and the tracking error signal supplied from the RF amplifier 14, the servo control unit 15 generates a focus servo signal and a tracking servo signal, respectively, and supplies the focus servo signal and the tracking servo signal to an actuator (not shown) of the pickup unit 13. The servo control unit 15 also generates a spindle-motor drive signal for driving the spindle motor 12 so as to control a spindle servo operation for rotating the optical disk 11 at a predetermined rotational speed.

The servo control unit 15 further performs thread control to change the illumination position of the laser light by moving the pickup unit 13 in the radial direction of the optical disk 11. A control unit 20 sets a signal-reading position of the optical disk 11 and controls the position of the pickup unit 13 so that a signal can be read from the set reading position.

The signal processor 16 modulates recording data input from a memory controller 17 to generate a recording signal and supplies the recording signal to the pickup unit 13. The signal processor 16 also demodulates a reproduction signal supplied from the RF amplifier 14 to generate reproduction data and supplies the reproduction data to the memory controller 17.

As described above, the memory controller 17 stores recording data, input from a data converter 19, into a memory 18, reads the recording data therefrom, and supplies the recording data to the signal processor 16, as appropriate. The memory controller 17 also stores the reproduction data, supplied from the signal processor 16, into the memory 18, reads the reproduction data therefrom, and supplies the reproduction data to the data converter 19, as appropriate.

A signal input/output device 31 supplies, to the data converter 19, signals of audio and video captured by a video camera (not shown) or signals reproduced from a storage medium (not shown). The data converter 19 compresses those signals according to, for example, an MPEG (Moving Picture Experts Group) or JPEG (Joint Photographic Experts Group) system to generate recording data, as needed, and supplies the recording data to the memory controller 17.

In addition to a video signal obtained by capturing an image of a subject and an audio signal associated with the video signal, signals provided by the video camera include metadata that serves as information regarding the video signal. The recording data generated includes the metadata.

Examples of the metadata include, with respect to video signals, KLV (key length value) metadata attached to, for example, each frame; GPS (global positioning system) information indicating a position where an image is captured by a video camera; date and time (year, month, date, time, minute, and second) when the image capture is performed, ARIB (Association of Radio Industries and Businesses) metadata; and camera data containing configuration/control information of the video camera that has captured the image. The KLV metadata includes LTC (longitudinal time code) that serves as a time code set in reference data, UBs (user bits) that defines a feature of the LTC, and a UMID (unique material identifier) that serve as a worldwide unique ID. The ARIB metadata, which was standardized by ARIB, is superimposed on a standard communication interface, such as an SDI (serial digital interface). Examples of camera data include an iris (iris) control value, a white-balance/black-balance mode, and lens information regarding lens zooming and focusing.

Examples of essential portions of metadata include LTC/UBs and a UMID having a KLV data structure and other KLV metadata (e.g., an essence mark, which is electronic mark data indicating features of video or audio) and examples of optional portions of metadata include ARIB metadata, camera metadata, and GPS data.

In this embodiment, metadata regarding each frame is referred to as "frame metadata" and metadata regarding a clip is referred to as "clip metadata", and details thereof are described below. The frame metadata is periodically recorded on the optical disk 11 at timing at which a video signal and an audio signal are recorded and the clip data is recorded independently (at random). The term "frame" herein refers to one picture (image) that provides a GOP (Group Of Picture) and the term "clip" refers to AV data (e.g., a series of video data constituted in units of GOP) that serves as material data in a predetermined range from when an image-capture device starts a series of recording and until it finishes the recording.

The frame metadata is described in a predetermined language, such as a BIM (Binary Format for Metadata) based language, which is converted from an XML (extensible Markup Language) system file into a binary file. In order to allow the disk apparatus 10 to perform recording to and reproducing from the optical disk 11 with simple processing (to reduce the load of CPU processing), the essential portion and the optional portion are combined into one file. More specifically, the frame metadata is metadata that is periodically output in synchronization with a video signal and an audio signal and that requires a real-time characteristic (a real-time characteristic). A BIM format that is less in the amount of data is used for the frame metadata. In terms of the complexity of file management and mount/unmount time, the frame metadata also needs to be output through frame interleaving as in the case of the ARIB metadata, and thus one file is used per frame. Further, it is desired that the camera metadata and so on in the optional portion are expressed in text so that the data can be easily read by a personal computer or the like.

The frame metadata is arranged, on the optical disk 11, in the vicinity of material data (AV data) for each frame and is recorded. This arrangement can minimize the occurrence of a seek operation when the frame metadata is read, thereby achieving high-speed reproduction.

The clip metadata is described in, for example, a predetermined XML-based language. In order to allow the disk apparatus 10 to perform recording to and reproducing from the optical disk 11 with simple processing (to reduce the load of CPU processing), an LTC/UMID, GPS data, and other metadata (e.g., a front-end time code, discontinuous-point time code information (information having a set of frame numbers from the front end), a front-end extended UMID source pack (e.g., recording date and time, a recording place, user information), and a discontinuous-point extended UMID source pack) are combined into one file. More specifically, the clip metadata is metadata that has the attributes of a clip and an edit result and that does not require a real-time characteristic. An XML format is used for the clip metadata. Further, with the clip metadata, the LTC/UMID changes in the number of variation points and GPS data changes in the amount of data with time. In order to ensure that there is no problem even if the amount of data changes, one file is used for each clip. Further, it is desired that the GPS data and other metadata are expressed in text so that the data can be easily read by a personal computer or the like.

Unlike the frame metadata that is recorded onto the optical disk 11 for each frame, the clip metadata is recorded for each clip. This can reduce the read time and can achieve high-speed retrieval of a specific frame based on a time code, the date and time of recording, the place of recording, or user information. The clip metadata may be recorded on the optical disk 11 at the inner circumference side of material data, at the outer circumference side of material data, or in a specific area in a contiguous manner. Alternatively, the clip metadata may be separately recorded in a plurality of specific areas.

Referring back to FIG. 1, the data converter 19 decompresses the reproduction data supplied from the memory controller 17 as needed, converts the decompressed data into an output signal in a predetermined format, and supplies the output signal to the signal input/output device 31.

In accordance with an operation signal supplied from an operation unit 21, the control unit 20 controls the servo control unit 15, the signal processor 16, the memory controller 17, and the data converter 19 to execute record/reproduction processing.

The operation unit 21 is operated by, for example, a user and supplies an operation signal corresponding to his/her operation to the control unit 20.

With the disk recording/reproducing apparatus 10 having the above-described configuration, when the user operates the operation unit 21 to give an instruction for data recording, data is supplied from the signal input/output device 31 and is supplied to the optical disk 11 via the data converter 19, the memory controller 17, the signal processor 16, and the pickup unit 13, so that the data is recorded.

The optical disk 11 is, for example, a large-capacity next-generation optical disk, which can record a large amount (e.g., several hundred gigabytes) of data. The optical disk 11, however, is not limited to such an example and thus may be any optical disk, such as a DVD-R (Digital Versatile Disc-Recordable), DVD-ROM (Read Only Memory), DVD-RAM (Random Access Memory), CD-R (Compact Disc-Recordable), or CD-ROM.

When the user operates the operation unit 21 to give an instruction for data reproduction, data is read and reproduced from the optical disk 11 and is supplied to the signal input/output device 31 via the pickup unit 13, the RF amplifier 14, the signal processor 16, the memory controller 17, and the data converter 19.

Figure 2:
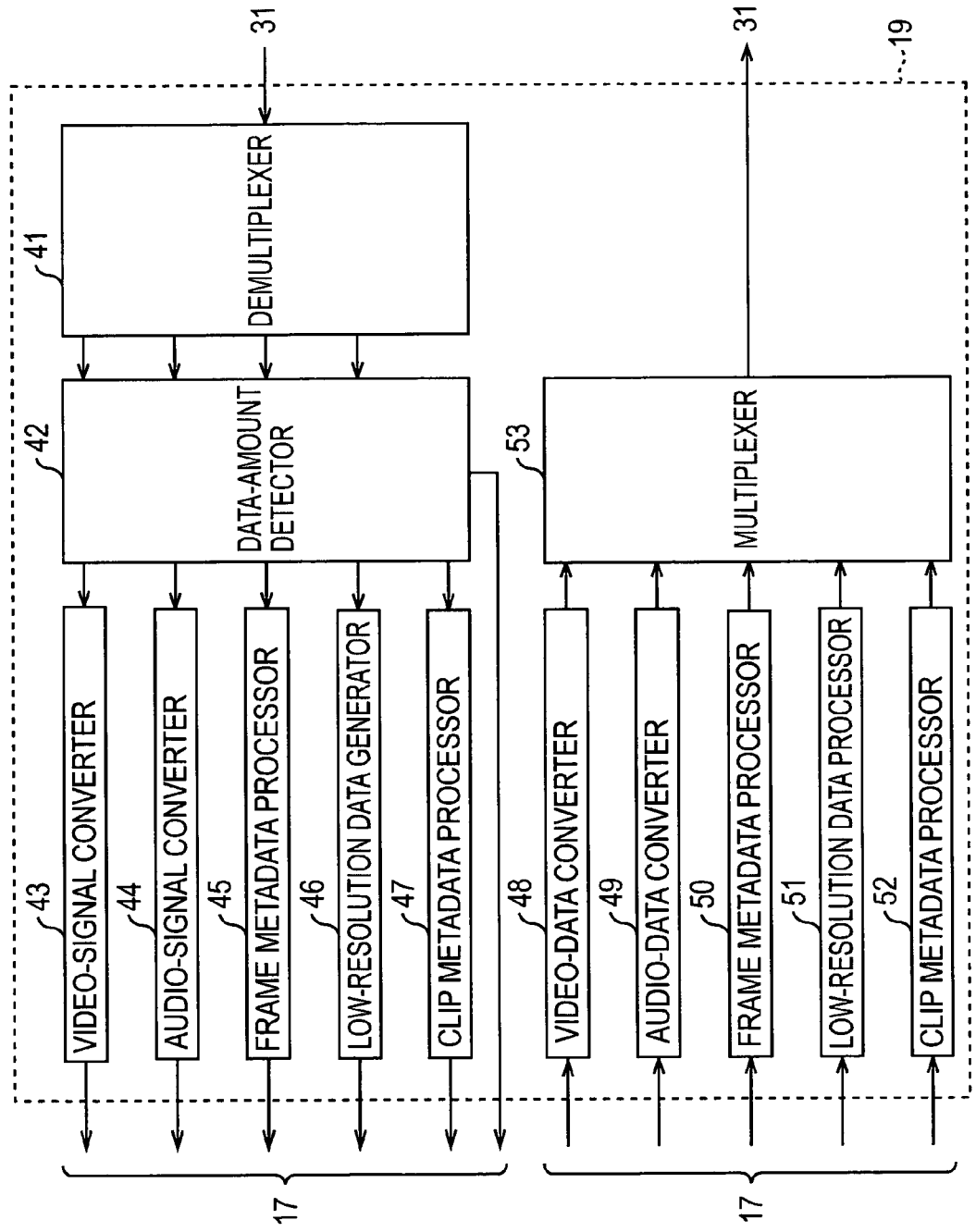
FIG. 2 is a block diagram showing an exemplary configuration of a data converter.

FIG. 2 shows an exemplary configuration of the data converter 19 shown in FIG. 1.

When data is recorded onto the optical disk 11, a signal to be recorded is supplied from the signal input/output device 31 to a demultiplexer 41. The demultiplexer 41 separates a plurality of associated data sequences, i.e., a (e.g., baseband) signal for a moving image and an (e.g., baseband) audio signal associated with the video signal, from the signal supplied from the signal input/output device 31. The demultiplexer 41 then supplies the resulting signals to a data-amount detector 42. Further, the demultiplexer 41 separates frame metadata for the video signal and supplies the resulting signal to the data-amount detector 42. The demultiplexer 41 also supplies clip metadata, such as an edit result supplied from the signal input/output device 31, to the data-amount detector 42.

The data-amount detector 42 directly supplies the video signal, the audio signal, and the frame data, which are supplied from the demultiplexer 41, to a video-signal converter 43, an audio-signal converter 44, and a frame-metadata processor 45, respectively. The data-amount detector 42 also detects the amount of data of the video signal and the audio signal and supplies the detected amount of data to the memory controller 17. That is, for each of the video signal, the audio signal, and the frame data which are supplied from the demultiplexer 41, the data-amount detector 42 detects the amount of data for, for example, a predetermined reproduction time and supplies the detected amount of data to the memory controller 17.

The data-amount detector 42 also supplies the video signal and further, as needed, the audio signal, supplied from the demultiplexer 41, to a low-resolution data generator 46. The data-amount detector 42 further supplies the clip metadata, supplied from the demultiplexer 41, to a clip-metadata processor 47.

The video-signal converter 43 encodes the video signal, supplied from the data-amount detector 42, into, for example, an I (intra) picture in an MPEG format for every frame and supplies the data sequence of the resulting video data to the memory controller 17. The video-signal converter 43 also performs, for example, MPEG encoding on the audio signal supplied from the data-amount detector 42, and supplies a data sequence of the resulting audio data to the memory controller 17.

The video data and the audio data supplied to the memory controller 17 are supplied to the optical disk 11 and are recorded, as described above.

The frame-metadata processor 45 rearranges components (e.g., a time code and the date and time of image capturing) of the frame metadata supplied via the data-amount detector 42, as needed, and supplies the data sequence of the resulting frame metadata to the memory controller 17.

The low-resolution data generator 46 generates a data sequence of low-resolution data, which is data having a reduced amount of data supplied thereto, and supplies the data sequence to the memory controller 17.

That is, the low-resolution data generator 46, for example, thins out the number of pixels for each frame of the video signal, supplied via the data-amount detector 42, to generate a small-image signal, which is a video signal of a frame having a small number of pixels. Further, the low-resolution data generator 46 encodes the small-image signal by, for example, an MPEG-4 system and outputs the encoding result as low resolution data.

For example, by thinning out the audio signal supplied via the data-amount detector 42 or thinning out samples of the audio signal, the low-resolution data generator 46 can contain the resulting audio signal, which has a reduced amount of data, in the low-resolution data (e.g., in a format in which an audio signal is multiplexed into a small-image signal for each frame or the like) for output. It is assumed in the below that the low-resolution data contains an audio signal.

The data series of the video data output from the video-signal converter 43 and the data series of audio data output from the audio-signal converter 44 have the same content as the data series of video data and audio data of the low-resolution data output from the low-resolution data generator 46. The video data output from the video-signal converter 43 and the audio data output from the audio-signal converter 44 are essentially to be supplied to the user. Thus, the video data output from the video-signal converter 43 and the audio data output from the audio-signal converter 44 will hereinafter be referred to as "mainstream data", as appropriate.

As described above, although the low-resolution data is video and audio data having the same content as the mainstream data, the amount of data is small. Thus, for a certain reproduction time, low-resolution data can be read from the optical disk 11 in a short period of time, compared to the mainstream data.

The mainstream data can have a data rate of, for example, about 25 Mbps (Mega bit per second). In this case, the low-resolution data can have a data rate of, for example, about 3 Mbps. In addition, in this case, when the data rate of the frame metadata is, for example, about 2 Mpbs, the data rate of the entire data recorded on the optical disk 11 becomes about 30 (25+3+2) Mbps. This arrangement allows for the use a recording rate of, for example, 35 Mbps, which falls in a sufficiently practical range, for the optical disk 11 (or the disk recording/reproducing apparatus 10 for driving the optical disk 11).

The clip-metadata processor 47 rearranges components (e.g., discontinuous-point time code) of the clip metadata supplied via the data-amount detector 42, as needed, and supplies the data sequence of the resulting clip metadata to the memory controller 17.

As described above, the data converter 19 supplies not only the data series of the mainstream data (the video data and audio data) but also the data series of frame metadata, low-resolution data, and clip metadata to the memory controller 17. The mainstream data, frame metadata, low-resolution data, and clip metadata which are supplied to the memory controller 17 are supplied to the optical disk 11 and are recorded.

The mainstream data, frame metadata, low-resolution data, and clip metadata are recorded on the optical disk 11 as if the annuli of a tree were formed. Accordingly, respective blocks of data recorded on the optical disk 11 are called audio "annulus" data, video "annulus" data, low-resolution "annulus" data, frame-meta "annulus" data, and clip-meta "annulus"

data. Hereinafter, a block of data included in a data series and recorded on the optical disk 11 just like forming annuli of a tree will be referred to as "annulus data", as appropriate.

On the other hand, when data is reproduced from the optical disk 11, mainstream data (video data and audio data), frame metadata, low-resolution data, or clip metadata is read from the optical disk 11, as needed. The video data and the audio data which constitute the mainstream data are supplied from the memory controller 17 to a video-data converter 48 and an audio-data converter 49, respectively.

The video data converter 48 performs, for example, MPEG decoding on a data series of video data supplied from the memory controller 17, and supplies the resulting video signal to a multiplexer 53. The audio-data converter 49 performs, for example, MPEG decoding on a data series of audio data supplied from the memory controller 17, and supplies the resulting audio signal to the multiplexer 53.

The frame metadata, low-resolution data, the clip metadata are supplied to a frame-metadata processor 50, a low-resolution data processor 51, and a clip-metadata processor 52, respectively. The frame-metadata processor 50 changes the arrangement positions of components of the frame metadata supplied thereto, as needed, and supplies the resulting data to the multiplexer 53. The low-resolution data processor 51 decodes the low-resolution data supplied thereto into a video signal and an audio signal which have a reduced amount of data and supplies the video signal and the audio signal to the demultiplexer 53. The clip-metadata processor 52 changes the arrangement positions of components of the clip metadata supplied thereto, as needed, and supplies the resulting data to the multiplexer 53.

The multiplexer 53 supplies, to the signal input/output device 31, the video signal supplied from the video data converter 48, the audio signal supplied from the audio-data converter 49, the frame metadata supplied from the frame-metadata processor 50, the video signal and the audio signal which have a reduced amount of data and which are supplied from the low-resolution data processor 51, and the clip metadata supplied from the clip-metadata processor 52. The multiplexer 53 can multiplex the video signal supplied from the video data converter 48, the audio signal supplied from the audio-data converter 49, the frame metadata supplied from the frame-metadata processor 50, and the video signal and the audio signal which have a reduced amount of data and which are supplied from the low-resolution data processor 51, and can output the resulting signals. Alternatively, the multiplexer 53 can output those respective signals (data) independently in parallel.

Record processing performed by the control unit 20 when the data converter 19 has the configuration shown in FIG. 2 will now be described with reference to a flow chart shown in FIG. 3.

When the operation unit 21 is operated, an operation signal for instruction for starting record-processing is supplied from the operation unit 21 to the control unit 20. In response to the operation signal, the control unit 20 starts record processing.

Thus, first, in step S1, the control unit 20 sets audio annulus size $T_{sa}$, video annulus size $T_{sv}$, low-resolution annulus size $T_{sl}$, and frame-meta annulus size $T_{sm}$.

Audio annulus size $T_{sa}$ is a variable that defines the amount of audio data A that is to be arranged and recorded on the optical disk 11 in a contiguous manner, and is expressed by, for example, the reproduction time of an audio signal. Similarly, video annulus size $T_{sv}$ is a variable that defines the amount of video data V arranged in one block and recorded on the optical disk 11, and is expressed by, for example, the reproduction time of a video signal. Low-resolution annulus size $T_{sl}$ is a variable that defines the amount of low-resolution data that is to be arranged and recorded on the optical disk 11 in a contiguous manner, and is expressed by the reproduction time of a video signal (or an audio signal) that is a source of the low-resolution data. The frame-meta annulus size $T_s$ is a variable that defines the amount of frame metadata that is to be arranged and recorded on the optical disk 11 in a contiguous manner, and is expressed by the reproduction time of a video signal (or an audio signal) for which the frame metadata describes various types of information (e.g., date and time when the image is captured).

The reason why audio annulus size $T_{sa}$, video annulus size $T_{sv}$, low-resolution annulus size $T_{sl}$, and frame-meta annulus size $T_{sm}$ are expressed by reproduction time in a indirect manner, rather than being expressed by the amount of data, such as the number of bits or the number of bytes, is as follows.

That is, according to the record processing shown in FIG. 3, audio annulus data, video annulus data, low-resolution annulus data, and frame-meta annulus data are periodically arranged and recorded on the optical disk 11, as described below. In this case, the audio annulus data is extracted from a series of audio data A and is a block of audio data having an amount of data based on audio annulus size $T_{sa}$, the video annulus data is extracted from a series of video data V and is a block of video data having an amount of data based on video annulus size $T_{sv}$, the low-resolution annulus data is extracted from a data series of low-resolution data and is a block of low-resolution data having an amount of data based on low-resolution annulus size $T_{sl}$, and the frame-meta annulus data is extracted from a data series of frame metadata and is a block of frame metadata having an amount of data based on frame-meta annulus size $T_{sm}$.

When the audio annulus data, the video annulus data, the low-resolution annulus data, and the frame-meta annulus data are periodically arranged and recorded on the optical disk 11, as described above, video and audio cannot be reproduced unless a video signal synchronizes with an audio signal associated with the video signal. In view of such reproduction, audio annulus data for a certain reproduction time-frame and video annulus data for the same reproduction time-frame must be recorded at close positions, i.e., adjacent positions, on the optical disk 11. Further, the audio annulus data and the video annulus data are data having a reduced amount of audio annulus data and video annulus data, and represent information regarding audio annulus data and video annulus data. Thus, audio annulus data and image annulus data for a certain reproduction time-frame and low-resolution annulus data and meta annulus data for the same reproduction time-frame must also be recorded at close positions on the optical disk 11.

However, when the amount of data of audio data A and the amount of data of video data V for the same reproduction time are compared with each other, typically, the amounts of data are greatly different from each other. That is, the amount of data of audio data A for a certain reproduction time is considerably smaller than the amount of data of video data V for the same reproduction time. Additionally, in some cases, the data rate of audio data A and video data V are variable, rather than being constant.

Also, when the data rates of audio data A and video data V for the same reproduction time are compared with the data rates of low-resolution data and frame metadata, the data rates of the low-resolution data and frame metadata are smaller than the data rates of audio data A and video data V.

Thus, audio annulus size $T_{sa}$, the video annulus size $T_{sv}$, low-resolution annulus size $T_{sl}$, and frame-meta annulus size $T_{sm}$ are each expressed by the amount of data, and audio annulus data, video annulus data, low-resolution annulus data, and frame-meta annulus data having the corresponding amount of data are sequentially extracted from a series of audio data A, a series of video data V, a series of low-resolution data, and a series of frame metadata, respectively. By doing so, audio annulus data, low-resolution data, and frame metadata which a reproduction time-frame in which the reproduction time is ahead (earlier) relative to video annulus data for each reproduction time-frame are obtained. This makes it difficult to provide an arrangement in which audio data, video data, low-resolution data, and frame metadata which are supposed to be reproduced in the same reproduction time-frame are located at close positions on the optical disk 11.

Accordingly, audio annulus size $T_{sa}$, video annulus size $T_{sv}$, low-resolution annulus size $T_{sl}$, and frame-meta annulus size $T_{sm}$ are each expressed by reproduction time, and audio annulus data, video annulus data, low-resolution annulus data, and frame-meta annulus data which have the amount of data corresponding to the reproduction time are sequentially extracted from a series of audio data A, a series of video data V, a series of low-resolution data, and a series of frame metadata, respectively. By doing so, audio annulus data, video annulus data, low-resolution annulus data, and frame-meta annulus data which have a similar reproduction time-frame can be obtained as a set. This makes it possible to provide an arrangement in which audio data, video data, low-resolution data, and frame metadata which are supposed to be reproduced in the same reproduction time-frame are located at close positions on the optical disk 11.

The values of audio annulus size $T_{sa}$, video annulus size $T_{sv}$, low-resolution annulus size $T_{sl}$, and frame-meta annulus size $T_{sm}$ which are set in step S1 may be predetermined fixed values or variable values. When the values of audio annulus size $T_{sa}$, video annulus size $T_{sv}$, low-resolution annulus size $T_{sl}$, and frame-meta annulus size $T_{sm}$ are designed to be variable values, the variable values can be input, for example, through the operation of the operation unit 21.

After the processing in step S1, the process proceeds to step S2. The control unit 20 controls the data converter 19 to compress and encode the audio signal and video signal, which are supplied to the disk recording/reproducing apparatus 10 from the signal input/output device 31, and to start audio-signal conversion processing and video-signal conversion processing to generate a series of audio data A and a series of video data V, respectively. The control unit 20 further controls the memory controller 17 to start audio-data storage processing and video-data storage processing for supplying audio data A and video data V, respectively, which are obtained by the data converter 19 to the memory 18.

Also, in step S2, the control unit 20 controls the data converter 19 to start frame-metadata processing for processing a series of frame metadata supplied from the signal input/output device 31 to the disk recording/reproducing apparatus 10 and low-resolution data generation processing for generating a series of low-resolution data from the audio signal and video signal supplied from the signal input/output device 31 to the disk recording/reproducing apparatus 10. The control unit 20 further controls the memory controller 17 to start frame-metadata storage processing and low-resolution storage processing for supplying the frame metadata and the low-resolution data which are obtained by the data converter 19 to the memory 18 and storing the data.

Further, in step S2, the control unit 20 controls the data converter 19 to start clip-metadata processing for processing the series of clip metadata supplied from the signal input/output device 31 to the disk recording/reproducing apparatus 10 and also controls the memory controller 17 to start clip-metadata storage processing for supplying the clip metadata obtained by the data converter 19 to the memory 18 and storing the clip metadata.

The process proceeds to steps S3 and S4 in sequence. In step S3, the control unit 20 starts an audio-data recording task that is a control task for recording audio data A onto the optical disk 11. In step S4, the control unit 20 starts a video-data recording task that is a control task for recording video data V onto the optical disk 11, and then the process proceeds to steps S5 and S6 in sequence. In step S5, the control unit 20 starts a low-resolution data recording task that is a control task for recording low-resolution data onto the optical disk 11. In step S6, the control unit 20 starts a frame-metadata recording task that is a control task for recording frame metadata onto the optical disk 11, and the process proceeds to step S7. Details of the audio-data recording task in step S3, the video-data recording task in step S4, the low-resolution data recording task in step S5, and the frame-metadata recording task in step S6 are described below.

In step S7, the control unit 20 determines whether or not an operation signal for instruction for stopping data-recording has been supplied from the operation unit 21. When it is determined that an operation signal has not been supplied, the process proceeds to step S8, in which the control unit 20 determines whether or not all the recording tasks have finished. When it is determined in step S8 that not all the recording tasks have finished, the process returns to step S7, from which the same processing is repeated.

On the other hand, when it is determined in step S8 that all the recording tasks have finished, i.e., the audio-data recording task started in step S3, the video-data recording task started in step S4, the low-resolution data recording task started in step S5, and the frame-metadata recording task started in step S6 have finished, the process proceeds to step S11.

On the other hand, when it is determined in step S7 that an operation signal for instruction for stopping the data-recording has been supplied, i.e., for example, the user has operated the operation unit 21 so as to stop the data recording, the process proceeds to step S9. In step S9, the control unit 20 stops the audio-signal conversion processing, the video-signal conversion processing, the frame metadata processing, the low-resolution data generation processing, the audio-data storage processing, the video-data storage processing, the frame metadata storage processing, and the low-resolution storage processing started in S2, and the process proceeds to step S10.

In step S10, as in the case of step S8, the control unit 20 determines whether or not all the recording tasks have finished, and waits for a determination indicating that the all the recording tasks have finished.

When it is determined in step S10 that all the recording tasks have finished, i.e., the audio-data recording task started in step S3, the video-data recording task started in step S4, the low-resolution data recording task started in step S5, and the frame-metadata recording task started in step S6 have finished, the process proceeds to step S11.

In step S11, the control unit 20 stops the clip-metadata processing and the clip-metadata storage processing started in step S2. In step S12, the control unit 20 controls the memory controller 17 to retrieve clip metadata stored in the memory 18 and to supply the retrieved clip metadata to the signal processor 16 as clip-meta annulus data. As a result, the clip-meta annulus data is recorded on the optical disk 11. Thereafter, the recording processing ends.

The audio-data recording task started in step S3 shown in FIG. 3 will now be described with reference to a flow chart shown in FIG. 4.

When the audio-data recording task is started, first, in step S21, the control unit 20 initializes variable $N_a$, which is incremented by "1" in step S27 executed below, to, for example, "1", and the process proceeds to step S22.

In step S22, the control unit 20 determines whether $T_{sa} \times N_a$ is less than or equal to $T_{sv} \times N_v$, and further determines whether $T_{sa} \times N_a$ is less than or equal to $T_{sl} \times N_l$ and is less than or equal to $T_{sm} \times N_m$.

In this case, $T_{sa}$ is an audio annulus size and represents a certain reproduction time of an audio signal. Every time audio data (audio annulus data) having the amount of data based on audio annulus size $T_{sa}$ is recorded on the optical disk 11, variable $N_a$ is incremented by 1, as described below. $T_{sv}$ is a video annulus size, and every time video data (video annulus data) having the amount of data based on video annulus size $T_{sv}$ is recorded on the optical disk 11 in the video-data recording task, variable $N_v$ is incremented by 1, as described below. Thus, $T_{sa} \times N_a$ corresponds to the last reproduction time of audio annulus data to be recorded on the optical disk 11, when audio data is recorded in units of audio annulus size $T_{sa}$. Similarly, $T_{sv} \times N_v$ corresponds to the last reproduction time of video annulus data to be recorded on the optical disk 11, when video data is recorded in units of video annulus size $T_{sv}$.

$T_{sl}$ is a low-resolution annulus size, and every time low-resolution data (low-resolution annulus data) having the amount of data based on low-resolution annulus size $T_{se}$ is recorded on the optical disk 11 in the low-resolution recording task, variable $N_l$ is incremented by 1, as described below. Similarly, $T_{sm}$ is a frame-meta annulus size, and every time frame metadata (frame-meta annulus data) having the amount of data based on frame-meta annulus size $T_{sm}$ is recorded on the optical disk 11 in the frame-metadata recording task, variable $N_m$ is incremented by 1, as described below. Thus, $T_{sl} \times N_l$ corresponds to the last reproduction time of low-resolution annulus data to be recorded on the optical disk 11, when low-resolution data is recorded in units of low-resolution annulus size $T_{se}$. Similarly, $T_{sm} \times N_m$ corresponds to the last reproduction time of frame-meta annulus data to be recorded on the optical disk 11, when frame metadata is recorded in units of frame-meta annulus size $T_{sm}$.

It is now assumed that audio annulus data, video annulus data, low-resolution annulus data, and frame-meta annulus data are periodically arranged so that data having a similar reproduction time-frame are recorded at close positions on the optical disk 11. It is further assumed that, with respect to audio annulus data, video annulus data, low-resolution annulus data, and frame-meta annulus data, data having an earlier reproduction time is arranged at an earlier position (i.e., a position ahead in the order or writing/reading data to/from the optical disk 11) on the optical disk 11. It is further assumed that, with respect to audio annulus data, video annulus data, low-resolution annulus data, and frame-meta annulus data which have a similar reproduction time-frame, the data are arranged in the order of, for example, audio annulus data, video annulus data, low-resolution annulus data, and frame-meta annulus data.

In this case, when audio annulus data to be recorded is referred to as "audio annulus data of interest", the audio annulus data of interest becomes audio annulus data for the latest reproduction time-frame (Which is the closest to reproduction time $T_{sa} \times N_a$) prior to reproduction time $T_{sa} \times N_a$. The audio annulus data of interest needs to be recorded immediately before video annulus data, low-resolution annulus data, and frame-meta annulus data for the latest reproduction time-frame prior to reproduction time $T_{sa} \times N_a$ is recorded, i.e., immediately after video annulus data, low-resolution annulus data, and frame annulus data for the second latest reproduction time-frame prior to reproduction time $T_{sa} \times N_a$ are recorded.

Video annulus data to be recorded is video annulus data for the latest reproduction time prior to reproduction time $T_{sv} \times N_v$. Low-resolution data to be recorded is low-resolution annulus data for the latest reproduction time-frame prior to reproduction time $T_{sl} \times N_l$. Frame-meta annulus data to be recorded is frame-meta annulus data for the latest reproduction time-frame prior to reproduction time $T_{sm} \times N_m$. As described above, with respect to annulus data a for similar reproduction time-frame, audio annulus data is arranged at an earliest position on the optical disk 11. Thus, the video annulus data of interest must be recorded at timing at which reproduction time $T_{sa} \times N_a$ of audio annulus data is less than or equal to reproduction time $T_{sv} \times N_v$ of video annulus data, is less than or equal to reproduction time $T_{sl} \times N_l$ of low-resolution annulus data, and is less than or equal to reproduction time $T_{sm} \times N_m$ of frame-meta annulus data.

In step S22, a determination is made as to whether reproduction time $T_{sa} \times N_a$ of audio annulus data is less than or equal to reproduction time $T_{sv} \times N_v$ of video annulus data, is less than or equal to reproduction time $T_{sl} \times N_l$ of low-resolution annulus data, and is less than or equal to reproduction time $T_{sm} \times N_m$ of frame-meta annulus data. As a result, it is determined that whether or not the current timing is timing at which the audio annulus data of interest is to be recorded.

When it is determined in step S22 that reproduction time $T_{sa} \times N_a$ of audio annulus data is less (earlier) than or equal to any of reproduction time $T_{sv} \times N_v$ of video annulus data, reproduction time $T_{sl} \times N_l$ of low-resolution annulus data, and reproduction time $T_{sm} \times N_m$ of frame-meta annulus data, i.e., when it is determined that the current timing is timing at which the audio annulus data of interest is not to be recorded, the process returns to step S22 and then the same processing is repeated.

When it is determined in step S22 that reproduction time $T_{sa} \times N_a$ of audio annulus data is less than or equal to all of reproduction time $T_{sv} \times N_v$ of video annulus data, reproduction time $T_{sl} \times N_l$ of low-resolution annulus data, reproduction time $T_{sm} \times N_m$ of frame-meta annulus data, i.e., when it is determined that the current timing is timing at which the audio annulus data of interest is to be recorded, the process proceeds to step S23. In step S23, the control unit 20 determines whether or not audio data A is supplied from the data converter 19 to the memory 18 via the memory controller 17. When it is determined that audio data A is supplied, the process proceeds to step S24.

In step S24, the control unit 20 determines whether or not audio data A for cumulative amount of audio signal required for reproduction for audio annulus size $T_{sa} \times N_a$ has been stored in step S18. When it is determined that audio data A therefor has not been stored in the memory 18 yet, the process returns to step S22 and the subsequent processing is repeated. When it is determined in step S24 that audio data A for reproduction time $T_{sa} \times N_a$ has been stored in the memory 18, the process proceeds to step S25.

When the data-amount detector 42 in the data converter 19 detects the cumulative amount of audio signal required for reproduction for reproduction time $T_{sa} \times N_a$, the data-amount detector 42 issues a notification indicating the detected result to the memory controller 17. In accordance with the notification, the memory controller 17 determines whether or not audio data A having a commutative amount of data required for reproduction for reproduction time $T_{sa} \times N_a$ has been stored in the memory 18 and issues a notification indicating the determination result to the control unit 20. That is, the control unit 20 performs the determination in step S24, in accordance with the determination result issued from the memory controller 17. In this embodiment, although audio data obtained by compressing and encoding an audio signal is stored in the memory 18, the audio signal can also be stored in the memory 18 as audio data without being compressed and encoded.

Figure 5:
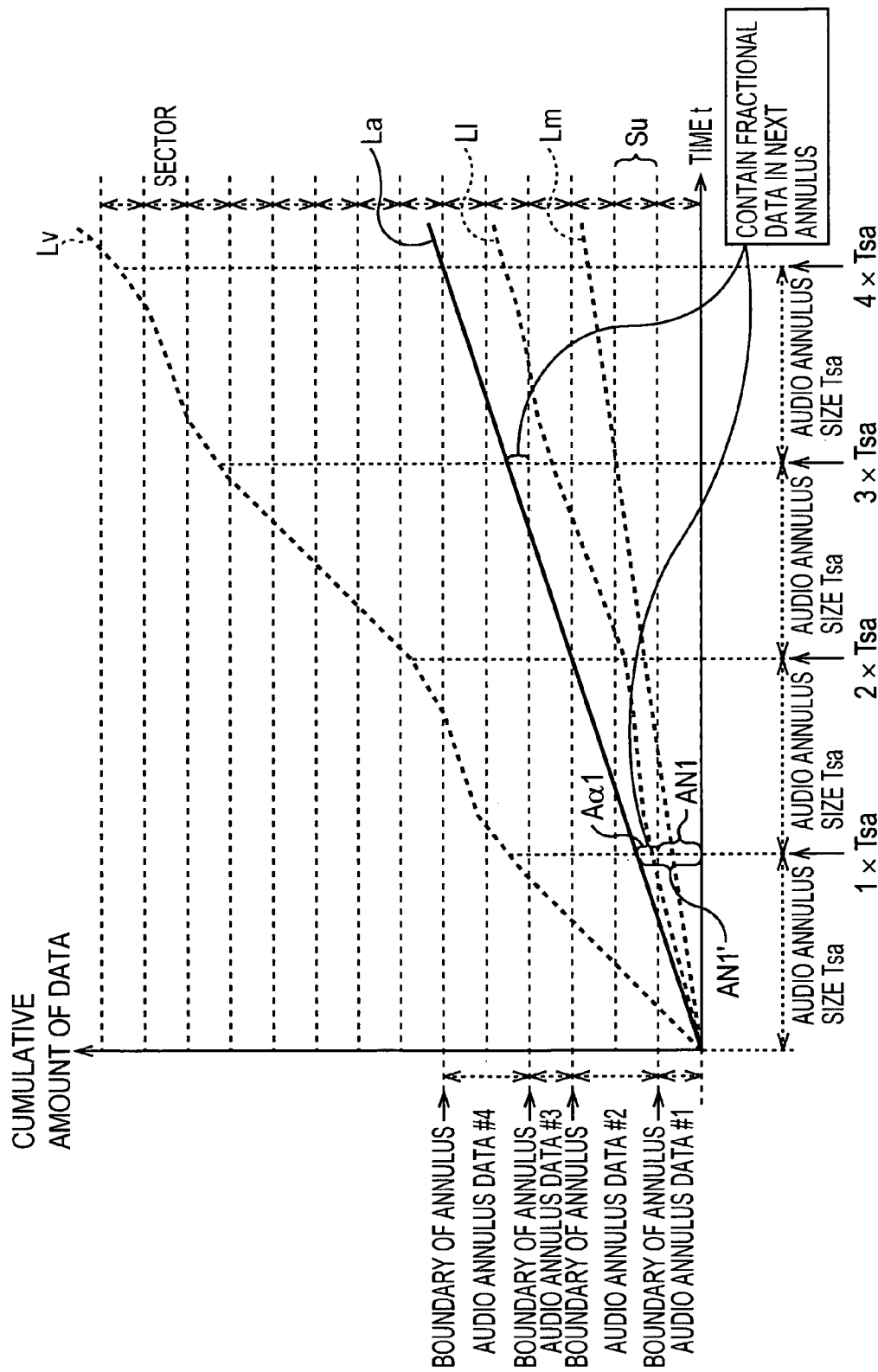
FIG. 5 is a graph showing a cumulative amount of data stored in a memory.
Figure 8:
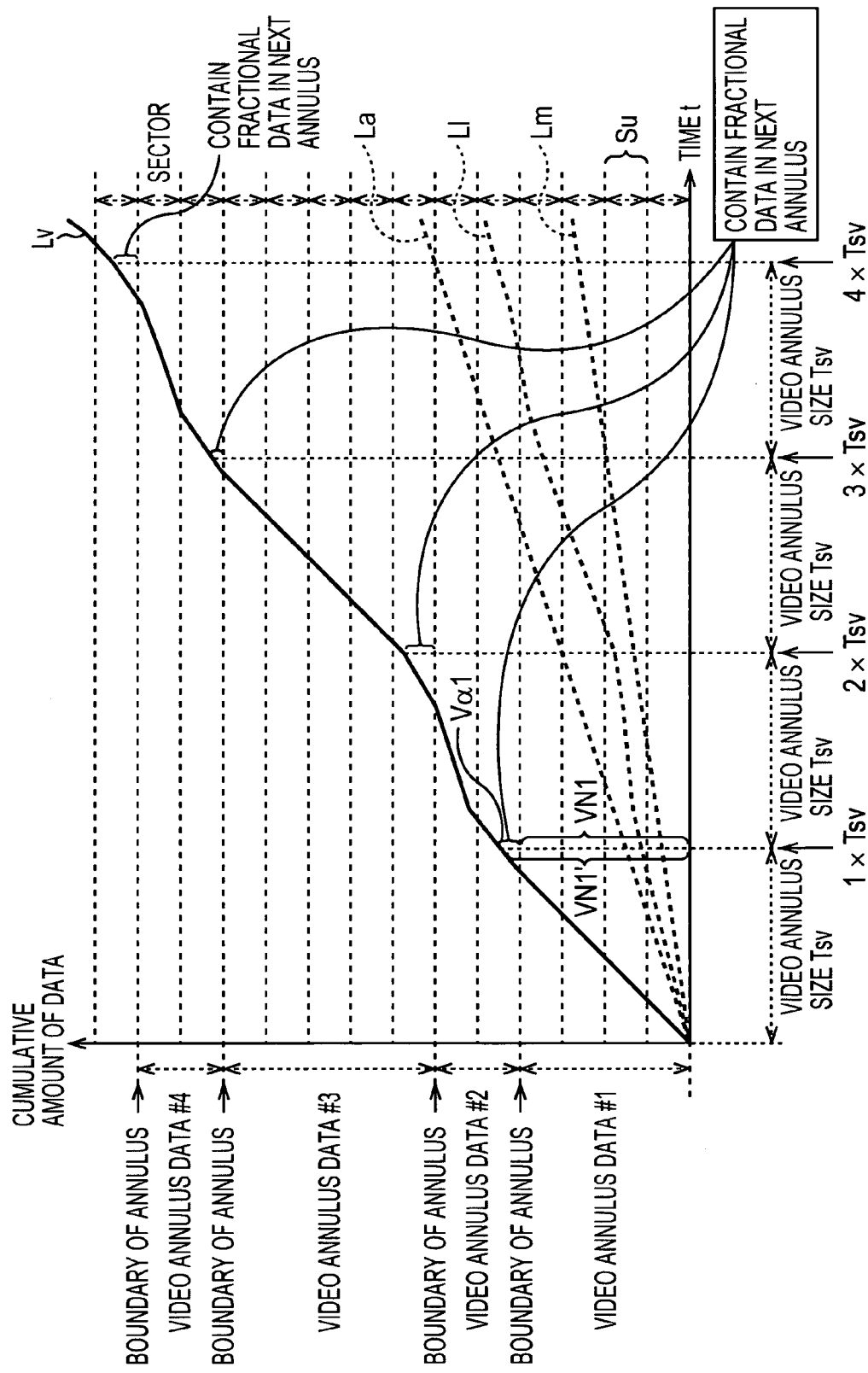
FIG. 8 is the cumulative amount of data stored in the memory.
Figure 10:
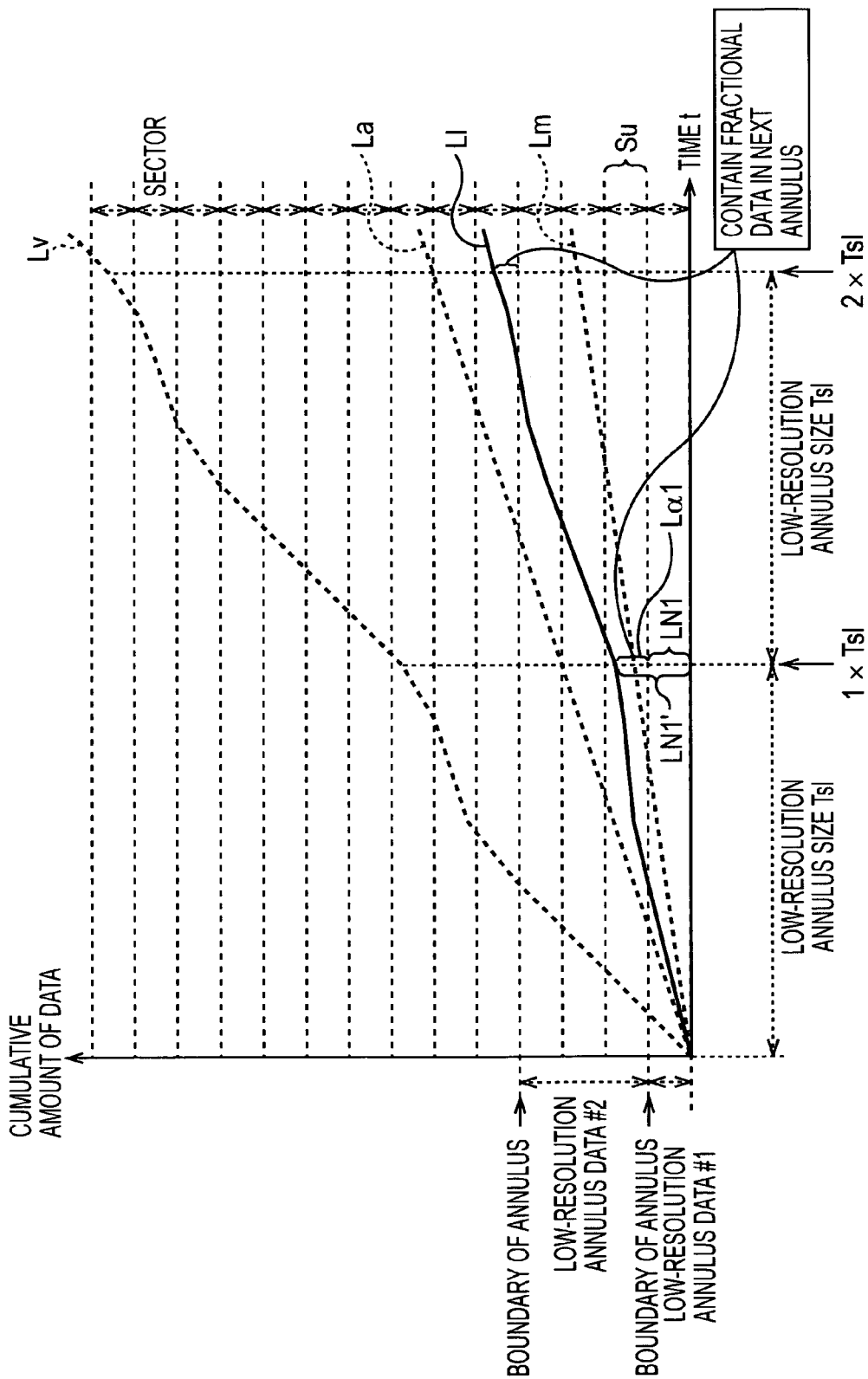
FIG. 10 shows the cumulative amount of data stored in the memory.
Figure 12:
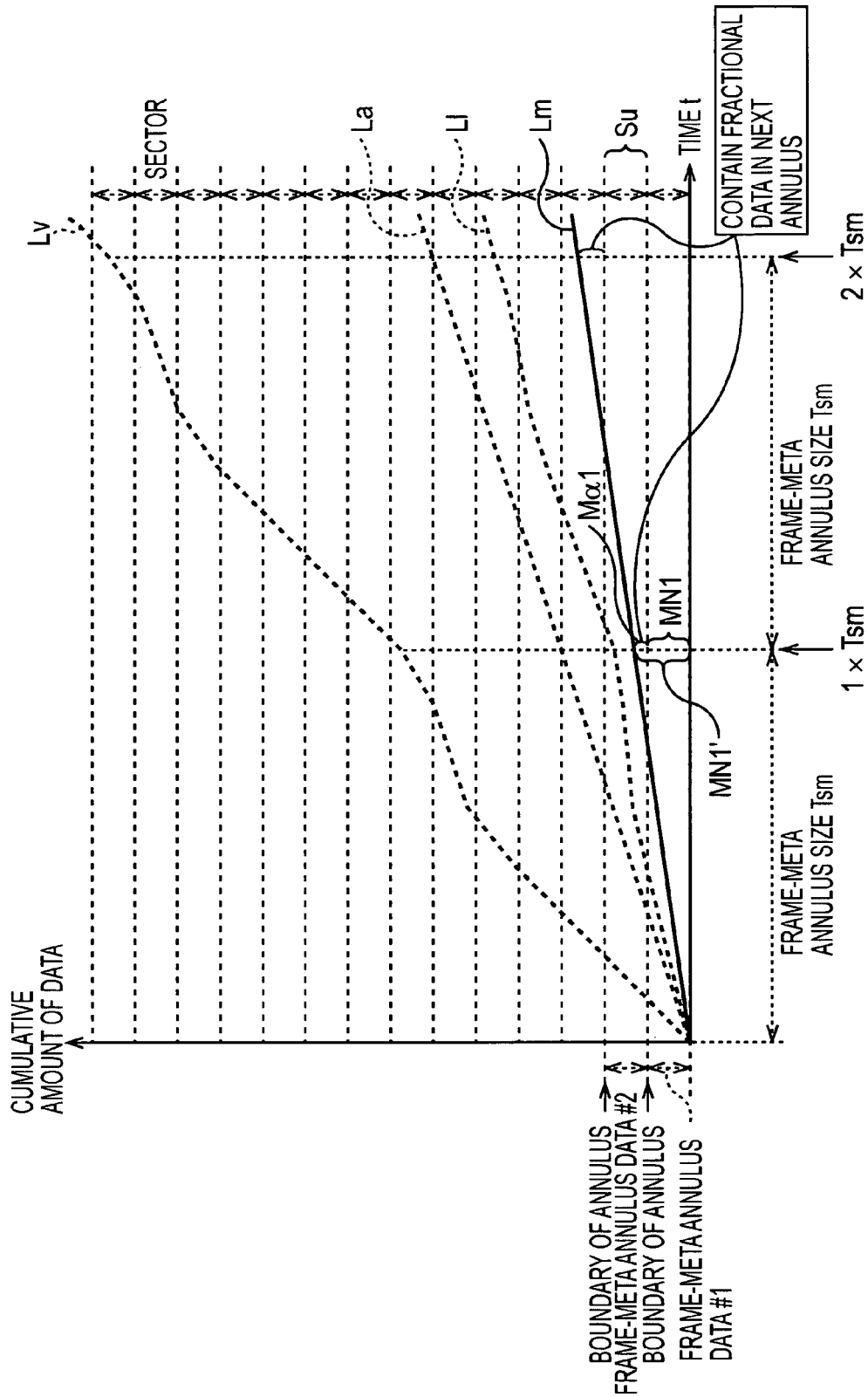
FIG. 12 is a graph showing a cumulative amount of data stored in the memory.

FIG. 5 is a graph showing a cumulative amount of data (cumulative data amount) La of audio data A stored in the memory 18 versus time (reproduction time). Small arrows indicating the vertical direction shown at the right hand side in FIG. 5 (i.e., arrows indicating the spacing of dotted lines in the horizontal direction) indicate an amount Su of data in sectors. A dotted line Lv in FIG. 5 indicates a cumulative amount Lv of data (cumulative data amount) of video data V stored in the memory 18, the cumulative data amount Lv being indicated by a solid line in FIG. 8 illustrated below. A dotted line Ll indicates a cumulative amount Ll of data (cumulative data amount) of low-resolution data stored in the memory 18, the cumulative data amount Ll being indicated by a solid line in FIG. 10 illustrated below. A dotted line Lm indicates a cumulative data amount Lm of frame metadata stored in the memory 18, the cumulative data amount Lm being indicated by a solid line in FIG. 12 illustrated below. Further, in FIG. 5, the cumulative data amount La of audio data A is represented by a straight line and thus the data rate of audio data A is constant. The data rate of audio data A, however, may be variable.

In FIG. 5, for example, for $N_a=1$, the data amount of audio data A required for reproduction for time $T_{sa} \times N_a$ (=1) is AN1'. Thus, for $N_a=1$ in step S24, when audio data A having the cumulative data amount AN1' is stored in the memory 18, it is determined that audio data A corresponding to reproduction time $T_{sa} \times N_a$ is stored in the memory 18 and the process proceeds to step S25.

In step S25, the control unit 20 controls the memory controller 17 to perform extraction by reading audio data A, on a first-in first-out basis, from audio data A stored in the memory 18. In this case, the read audio data A has an amount of data that is a maximum amount of data readable from the memory 18 and that is an integral multiple (n times) of the amount Su of data in, for example, one sector, which is a physical record/reproduction unit (a physical unit area) formed on the optical disc 11. Thereafter, the process proceeds to step S26. Audio annulus data that is read from the memory 18 as audio data A having an amount of data that is an integral multiple of data in the sector and that is a maximum amount of data readable from the memory 18 corresponds to the above-described latest audio annulus data prior to reproduction time $T_{sa} \times N_a$.

When time is $1 \times T_{sa}$ in FIG. 5, audio data A having a data amount AN1' is stored in the memory 18. The data amount AN1' is more than the amount of data for one sector but is less than the amount of data for two sectors. Thus, in step S25, audio data A having a data amount AN1, which is equal to the amount Su of data for one sector, is retrieved from the memory 18 as audio annulus data of interest.

Audio data that has not been read in step S25, i.e., audio data A having a data amount $A\alpha1$ that is less than the amount Su of data for one sector is left unchanged in the memory 18, when time shown in FIG. 5 is $1 \times T_{sa}$.

Referring back to FIG. 4, in step S26, the control unit 20 causes the memory controller 17 to supply the audio annulus data of interest which have been obtained in step S25 and which has an amount of data that is an integral multiple of data in one sector to the signal processor 16. Further, the control unit 20 controls recording so that the audio annulus data of interest having the amount of data that is an integral multiple of data in the sector is recorded in a number of sectors which is equal to the integral multiple.

Figure 6:
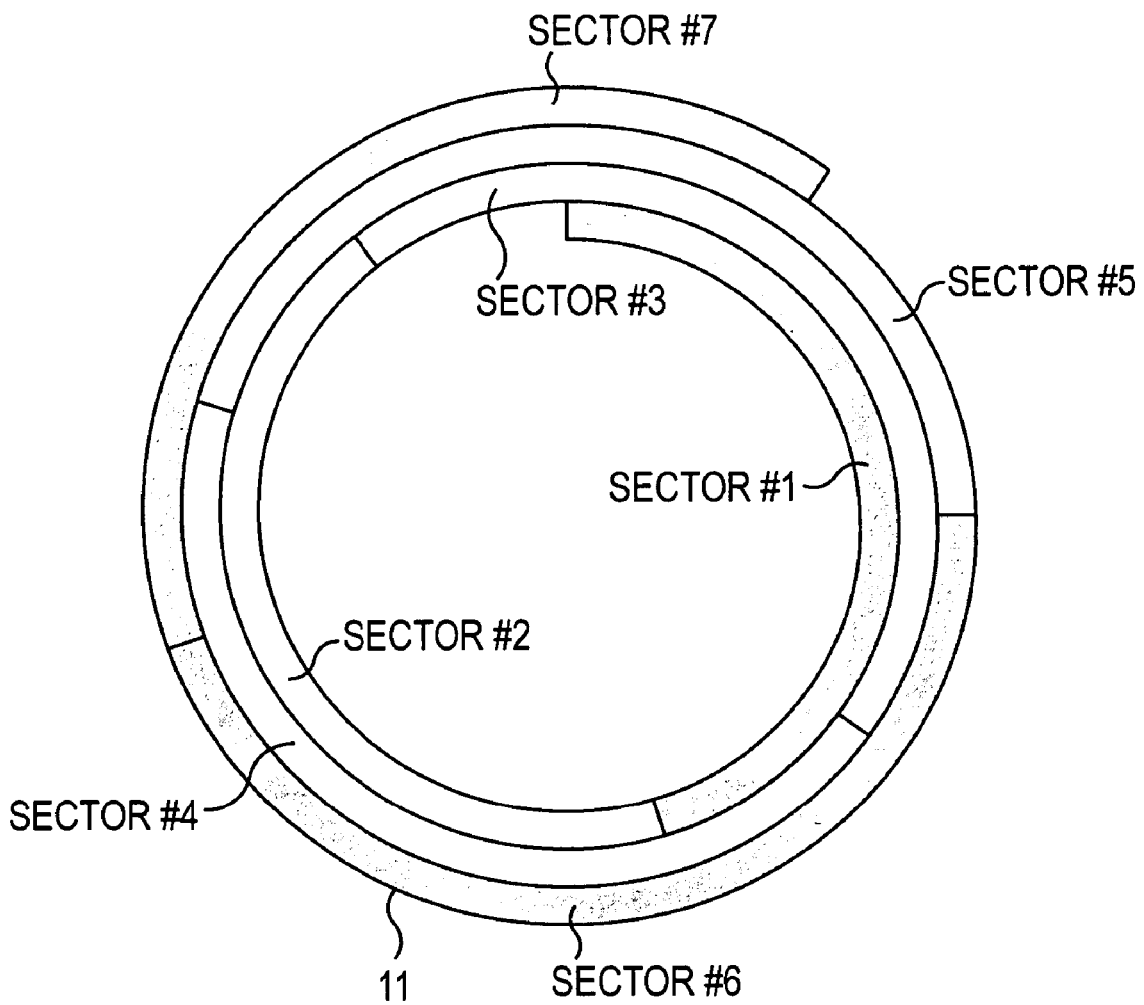
FIG. 6 is a view showing a state in which audio data and video data are recorded on an optical disk.

In this case, when time in FIG. 5 is $1 \times T_{sa}$, audio data A having the amount Su of data for one sector is supplied, as audio annulus data of interest, from the memory controller 17 to the signal processor 16. The audio annulus data of interest having the amount Su of data for one sector is supplied to the pickup unit 13. As shown in FIG. 6, the video annulus data of interest is recorded in sector #1, which is one sector of the optical disk 11, such that the boundaries of the video annulus data match the boundaries of the #1.

For simplicity of description, it is assumed in this case that the optical disk 11 has physically-contiguous and sufficiently-large free space. It is also assumed that data is written to or read from the optical disk 11, for example, from the inner circumference toward the outer circumference. Thus, data is recorded sequentially from the inner circumference side toward the outer circumference side of the free space in the order of data supplied from the memory controller 17 to the signal processor 16.

After the recording control for the audio annulus data of interest is performed in step S26 as described above, the process proceeds to step S27, in which the control unit 20 increments variable $N_a$ by 1. The process then returns to step S22, from which the subsequent processing is repeated.

Thus, in the example shown in FIG. 5, when time t is at $T_{sa}$, $2 \times T_{sa}$, $3 \times T_{sa}$, and $4 \times T_{sa}$, audio data for one sector, audio data for two sectors, audio data for one sector, and audio data for two sectors are extracted as audio annulus data #1, #2, #3, and #4, respectively, and are recorded so as to match boundaries on the disk 11.

In step S23, when the control unit 20 determines that audio data A has not been supplied to the memory 18, i.e., when the supply of audio data A from the data converter 19 to the memory controller 17 stops, the process proceeds to step S28. In step S28, the control unit 20 controls the memory controller 17 to read all audio data A currently left in the memory 18 and to add padding (padding) data for padding to audio data A so that the amount of read data becomes a minimum amount of data that is an integral multiple of data in the sector. As a result, audio data A read from the memory 18 becomes audio annulus data having the amount of data that is an integral multiple of data in the sector. By causing the audio annulus data to be supplied from the memory controller 17 to the signal processor 16, the control unit 20 controls recording so that audio annulus data having the amount of data that is an integral multiple of data in the sector is recorded in a number of sectors which is equal to the integral multiple.

Thereafter, the process proceeds to step S29, in which the control unit 20 sets variable $N_a$ to a value (an extremely large value) that corresponds to an infinite value, thereby ending the audio-data recording task.

The above description has been give of a case in which the physical unit area of the optical disk 11 is a sector, another area may be used. Examples include an ECC (error correcting code) block in which data of a unit on which ECC processing is performed is recorded. Alternatively, the physical unit area of the optical disk 11 may be a fixed numbers of sectors or a fixed number of ECC blocks.

The ECC processing is performed, for example, by the signal processor 16 in units of ECC blocks. A sector can be constituted by one or more ECC blocks. Further, each ECC block may be constituted by one or more ECC blocks can be used.

The following description is given of a case in which one sector is the physical unit area of the optical disk 11. When it is assumed that one ECC block is formed by one sector, the result of data recording on the optical disk 11 becomes the same in either case in which the physical unit area is a sector or an ECC block.

With this arrangement, audio annulus data having an amount of data that is an integral multiple of an amount of data, for example, in one sector, which is a physical unit area on the optical disk 11, is periodically stored in a number of sectors which is equal to the integral multiple so that the boundaries of the audio annulus data match the boundaries of the sectors of the optical disk 11.

The video-data recording task started in step S4 shown in FIG. 3 will now be described with reference to a flow chart shown in FIG. 7.

When the video-data recording task is started, first, in step S41, the control unit 20 initializes variable $N_v$, which is incremented by "1" in step S47 executed below, to, for example, "1", and the process proceeds to step S42.

In step S42, the control unit 20 determines whether $T_{sv} \times N_v$ is less than $T_{sa} \times N_a$, and further determines whether $T_{sv} \times N_v$ is less than or equal to $T_{si} \times N_l$ and is less than or equal to $T_{sm} \times N_m$.

As described above in the audio-data recording task, $T_{sa} \times N_a$ corresponds to the last reproduction time of audio annulus data to be recorded on the optical disk 11, when audio data is recorded in units of audio annulus size $T_{sa}$. $T_{sv} \times N_v$ corresponds to the last reproduction time of video annulus data to be recorded on the optical disk 11, when video data is recorded in units of video annulus size $T_{sv}$. $T_{sm} \times N_m$ corresponds to the last reproduction time of frame-meta annulus data to be recorded on the optical disk 11, when frame meta-data is recorded in units of frame-meta annulus size $T_{sm}$.

As described above, it is now assumed that audio annulus data, video annulus data, low-resolution annulus data, and frame-meta annulus data are periodically arranged so that data having a similar reproduction time-frame are recorded at close positions on the optical disk 11. It is further assumed that, with respect to audio annulus data, video annulus data, low-resolution annulus data, and frame-meta annulus data which have a similar reproduction time-frame, the data are arranged at an earlier position of the optical disc 11 in the order of, for example, audio annulus data, video annulus data, low-resolution annulus data, and frame-meta annulus data.

In this case, when video annulus data to be recorded is referred to as "video annulus data of interest", the video annulus data of interest becomes video annulus data for the latest reproduction time-frame (which is closest to reproduction time $T_{sv} \times N_v$) prior to reproduction time $T_{sv} \times N_v$. The video annulus data of interest needs to be recorded at a position immediately after audio annulus data for the latest reproduction time-frame prior to reproduction time $T_{sv} \times N_v$ and immediately before low-resolution annulus data and frame-meta annulus data are recorded, that is, needs to be recorded at a position immediately after low-resolution annulus data and frame-meta annulus data for the second latest reproduction time-frame prior to reproduction time $T_{sv} \times N_v$.

In step S42, a determination is made as to whether reproduction time $T_{sv} \times N_v$ of video annulus data is less than reproduction time $T_{sa} \times N_a$ of audio annulus data, is less than or equal to reproduction time $T_{si} \times N_l$ of low-resolution annulus data, and is less than or equal to reproduction time $T_{sm} \times N_m$ of frame-meta annulus data. As a result, it is determined whether or not the current timing is timing at which the video annulus data of interest is to be recorded.

When it is determined in step S42 that reproduction time $T_{sv} \times N_v$ of video annulus data is less than reproduction time $T_{sa} \times N_a$ of audio annulus data, is less than or equal to reproduction time $T_{si} \times N_l$ of low-resolution annulus data, or is less than or equal to reproduction time $T_{sm} \times N_m$ of frame-meta annulus data, i.e., when it is determined that the current timing is timing at which the video annulus data of interest is not to be recorded, the process returns to step S42 and then the same processing is repeated.

When it is determined in step S42 that reproduction time $T_{sv} \times N_v$ of video annulus data is less than reproduction time $T_{sa} \times N_a$ of audio annulus data, is less than or equal to reproduction time $T_{si} \times N_l$ of low-resolution annulus data, and is less than or equal to reproduction time $T_{sm} \times N_m$ of frame-meta annulus data, i.e., when it is determined that the current timing is timing at which the video annulus data of interest is to be recorded, the process proceeds to step S43. In step S43, the control unit 20 determines whether or not video data V is supplied from the data converter 19 to the memory 18 via the memory controller 17. When it is determined that video data V is supplied, the process proceeds to step S44.

In step S44, the control unit 20 determines whether or not video data V for the cumulative amount of video signal required for reproduction for video annulus size $T_{sv} \times N_v$ has been stored in the memory 18. When it is determined that video data V therefor has not been stored in the memory 18 yet, the process returns to step S42, from which the subsequent processing is repeated. When it is determined in step S44 that video data V corresponding to reproduction time $T_{sv} \times N_v$ has been stored in the memory 18, the process proceeds to step S45.

When the data-amount detector 42 in the data converter 19 detects the cumulative amount of video signal required for reproduction for reproduction time $T_{sv} \times N_v$, the data-amount detector 42 issues a notification indicating the detected result to the memory controller 17. In accordance with the notification, the memory controller 17 determines whether or not video data V having a cumulative amount of data required for reproduction for reproduction time $T_{sv} \times N_v$ has been stored in the memory 18 and issues a notification indicating the determination result to the control unit 20. That is, the control unit 20 performs the determination in step S44, in accordance with the determination result issued from the memory controller 17. In this embodiment, although video data obtained by compressing and encoding a video signal is stored in the memory 18, the video signal can also be stored in the memory 18 as video data without being compressed and encoded.

FIG. 8 shows the cumulative amount of data (cumulative data amount) La of video data V stored in the memory 18 versus time (reproduction time). Small arrows indicating the vertical direction shown at the right hand side in FIG. 8 (i.e., arrows indicating the spacing of dotted lines in the horizontal direction) indicate an amount Su of data in sectors, as in the case of FIG. 5. A dotted line La in FIG. 8 corresponds to the cumulative data amount La of audio data A stored in the memory 18, the cumulative data amount La indicated by the solid line in FIG. 5 illustrated above. A dotted line Ll indicates a cumulative data amount Ll of low-resolution data stored in the memory 18, the cumulative data amount Ll indicated by a solid line in FIG. 10 illustrated below. A dotted line Lm indicates a cumulative data amount Lm of frame metadata stored in the memory 18, the cumulative data amount Lm being indicated by a solid line in FIG. 12 illustrated below.

In FIG. 8, for example, for $N_v=1$, the data amount of video data V required for reproduction for time $T_{sv} \times N_v (=1)$ is VN1'. Thus, for $N_v=1$ in step S44, when video data V having the cumulative data amount VN1' is stored in the memory 18, it is determined that video data V corresponding to reproduction time $T_{sv} \times N_v$ is stored in the memory 18 and the process proceeds to step S45.

In step S45, the control unit 20 controls the memory controller 17 to perform extraction by reading video data V, on a first-in first-out basis, from video data V stored in the memory 18. In this case, the read video data V has an amount of data that is a maximum amount of data readable from the memory 18 and that is an integral multiple (n times) of the amount Su of data in, for example, one sector, which is a physical record/reproduction unit (a physical unit area) formed on the optical disc 11. The process then proceeds to step S46. Video annulus data that is read from the memory 18, as video data V having an amount of data that is an integral multiple of data in the sector and that is a maximum amount of data readable from the memory 18, corresponds to the latest video annulus data prior to reproduction time $T_{sv} \times N_v$ described above.

In this case, when time is $1 \times T_{sv}$ in FIG. 8, video data V having an at least data amount VN1' is stored in the memory 18. The data amount VN1' is more than the amount of data for four sectors but is less than the amount of data for five sectors. Thus, in step S45, video data V having a data amount VN1, which is equal to the amount Su of data for four sectors, is read and retrieved from the memory 18 as video annulus data of interest.

Video data that has not been read in step S45, i.e., video data V having a data amount V al that is less than the amount Su of data for one sector is left unchanged in the memory 18, when time is $1 \times T_{sv}$ in FIG. 8.

Referring back to FIG. 7, in step S46, the control unit 20 causes the memory controller 17 to supply the video annulus data of interest which has been obtained in step S45 and which has an amount of data that is an integral multiple of data in one sector to the signal processor 16. By doing so, the control unit 20 controls recording so that the video annulus data of interest having an amount of data that is an integral multiple of data in the sector is recorded in a number of sectors which is equal to the integral multiple.

In this case, when time in FIG. 8 is $1 \times T_{sv}$, video data V having the amount Su of data for four sectors is supplied, as video annulus data of interest, from the memory controller 17 to the signal processor 16. The video annulus data of interest having the amount Su of data for four sectors is supplied to the pickup unit 13. Thereafter, as shown in FIG. 6 illustrated above, the video annulus data of interest is recorded in sectors #2, #3, #4, and #5, which are four sectors of the optical disk 11, such that the boundaries of the video annulus data match the boundaries of sectors #2 to #5 (i.e., the boundary of the front-end of sector #2 and the boundary of the rear-end of sector #5) of the optical disk 11.

For simplicity of description, it is now assumed that audio annulus size $T_{sa}$ is equal to video annulus size $T_{sv}$. In the case of $N_a = N_a = 1$, after the video-data recording task shown in FIG. 7 is started, the latest audio annulus data prior to reproduction time $T_{sa} \times N_a$ is recorded in sector #1, as shown in FIG. 6. As a result of the audio annul-ring data recording in sector #1, in step S27 of the audio-data recording task shown in FIG. 4, variable $N_a$ is incremented by 1 to thereby yield $N_a = 2$. At this point, since variable $N_v$ is still "1", reproduction time $T_{sa} \times N_a$ is less than reproduction time $T_{sa} \times N_a$. As a result, in the video-data recording task shown in FIG. 7, in step S46, the latest video annulus data prior to reproduction time $T_{sv} \times N_v$ is recorded in sectors #2 to #5.

That is, in this case, as described above, data is recorded on the optical disk 11, in the order of data supplied from the memory controller 17 to the signal processor 16, sequentially from the inner circumference side toward the outer circumference side of a free space. Thus, video annulus data for four sectors which is the latest video annulus data prior to reproduction time $T_{sv} \times N_v$ is started at sector #2 immediately after sector #1 in which audio annulus data is recorded. As a result, the video annulus data is recorded in sectors #2 to #5, as shown in FIG. 6.

As a result, audio annulus data and video annulus data which are obtained in the case of $N_a = N_a = 1$, i.e., the latest audio annulus data prior to reproduction time $T_{sa} \times N_a$ and the latest video annulus data prior to reproduction time $T_{sv} \times N_v$ that is equal to the reproduction time $T_{sa} \times N_a$, i.e., audio annulus data and video annulus data which have a similar reproduction time-frame, are arranged at adjacent positions on the optical disk 11 and are recorded.

After the recording of the video annulus data of interest is controlled in step S46 as described above, the process proceeds to step S47. In step S47, the control unit 20 increments variable $N_v$ by 1, and the process returns to step S42, from which the subsequent processing is repeated.

That is, in the embodiment shown in FIG. 8, when time t is at $T_{sv}$, $2 \times T_{sv}$, $3 \times T_{sv}$, and $4 \times T_{sv}$, video data for four sectors, video data for two sectors, video data for five sectors, and video data for two sectors are extracted as video annulus data #1, #2, #3, and #4, respectively, and are recorded so as to match boundaries on the disk 11.

On the other hand, in step S43, when it is determined that video data V has not been supplied to the memory 18, i.e., when the supply of video data V from the data converter 19 to the memory controller 17 stops, the process proceeds to step S48. In step S48, the control unit 20 controls the memory controller 17 to read all video data V currently left in the memory 18 and to add padding data for padding to video data V so that the amount of read data becomes a minimum amount of data that is an integral multiple of data in the sector. As a result, video data V read from the memory 18 becomes video annulus data having an amount of data of an integral multiple of data in the sector. The control unit 20 further controls the memory controller 17 to supply the video annulus data to the signal processor 16, thereby controlling recording so that the video annulus data having an amount of data that is an integral multiple of data in the sector is recorded in a number of sectors which is equal to the integral multiple.

Thereafter, the process proceeds to step S49, in which the control unit 20 sets variable $N_v$ to a value corresponding to an infinite value, and the video-data recording task ends.

As a result, video annulus data having an amount of data that is an integral multiple of data of, for example, a sector, which is the physical unit area of the optical disk 11, is periodically stored in a number of sectors which is equal to the integral multiple so that the boundaries of the video annulus data match the boundaries of the sectors of the optical disk 11.

The low-resolution data recording task started in step S5 shown in FIG. 3 will now be described with reference to a flow chart shown in FIG. 9.

When the low-resolution data recording task is started, first, in step S61, the control unit 20 initializes variable $N_l$, which is incremented by "1" in step S67 executed below, to, for example, "1", and the process proceeds to step S62.

In step S62, the control unit 20 determines whether $T_{sl} \times N_l$ is less than $T_{sa} \times N_a$, and further determines whether $T_{sl} \times N_l$ is less than $T_{sv} \times N_v$ and is less than or equal to $T_{sm} \times N_m$.

In this case, when low-resolution annulus data to be recorded is referred to as "low-resolution annulus data of interest", the low-resolution annulus data of interest becomes low-resolution annulus data for the latest reproduction time-frame prior to reproduction time $T_{sl} \times N_l$. The low-resolution annulus data of interest needs to be recorded at a position immediately after audio annulus data and video annulus data for the latest reproduction time-frame prior to reproduction time $T_{si} \times N_l$ and immediately before frame-meta annulus data is recorded, that is, needs to be recorded at a position immediately after frame-meta annulus data for the second latest reproduction time-frame prior to reproduction time $T_{si} \times N_l$.

Thus, in step S62, a determination is made as to whether reproduction time $T_{si} \times N_l$ of low-resolution annulus data is less than reproduction time $T_{sa} \times N_a$ of audio annulus data, is less than reproduction time $T_{sv} \times N_v$ of video annulus data, and is less than or equal to reproduction time $T_{sm} \times N_m$ of frame-meta annulus data. As a result, it is determined whether or not the current timing is timing at which the low-resolution annulus data of interest is to be recorded.

When it is determined in step S62 that reproduction time $T_{si} \times N_l$ of low-resolution annulus data is less than reproduction time $T_{sa} \times N_a$ of audio annulus data, is less than reproduction time $T_{sv} \times N_v$ of video annulus data, or is less than or equal to reproduction time $T_{sm} \times N_m$ of frame-meta annulus data, i.e., when it is determined that the current timing is timing at which the low-resolution annulus data of interest is not to be recorded, the process returns to step S62 and then the same processing is repeated.

When it is determined in step S62 that reproduction time $T_{si} \times N_l$ of low-resolution annulus data is less than reproduction time $T_{sa} \times N_a$ of audio annulus data, is less than reproduction time $T_{sv} \times N_v$ of video annulus data, and is less than or equal to reproduction time $T_{sm} \times N_m$ of frame-meta annulus data, i.e., when it is determined that the current timing is timing at which the low-resolution annulus data of interest is to be recorded, the process proceeds to step S63. In step S63, the control unit 20 determines whether or not low-resolution data is supplied from the data converter 19 to the memory 18 via the memory controller 17. When it is determined that low-resolution data is supplied, the process proceeds to step S64.

In step S64, the control unit 20 determines whether or not low-resolution data having a cumulative amount of data required for reproduction for low-resolution annulus size $T_{si} \times N_l$ has been stored in the memory 18. When it is determined that low-resolution data therefor has not been stored in the memory 18 yet, the process returns to step S62 and the same processing is repeated. When it is determined in step S64 that low-resolution data for reproduction time $T_{si} \times N_l$ has been stored in the memory 18, the process proceeds to step S65.

When the data-amount detector 42 in the data converter 19 detects the cumulative amount of video signal and audio signal required for reproduction for reproduction time $T_{si} \times N_l$, the data-amount detector 42 issues a notification indicating the detected result to the memory controller 17. In accordance with the notification, the memory controller 17 determines whether or not low-resolution data having a cumulative amount of data required for reproduction for reproduction time $T_{si} \times N_l$ has been stored in the memory 18 and issues a notification indicating the determination result to the control unit 20. That is, the control unit 20 performs the determination in step S64, in accordance with the determination result issued from the memory controller 17. In this embodiment, although the low-resolution data is obtained by compressing and encoding a video signal or the like having a less amount of data of video signal or the like, alternatively, a video signal or the like having a less amount of data of video signal or the like may be directly used as the low-resolution data.

FIG. 10 shows a cumulative amount of data (cumulative data amount) Ll of low-resolution data stored in the memory 18 versus time (reproduction time). Small arrows indicating the vertical direction shown at the right hand side in FIG. 10 (i.e., arrows indicating the spacing of dotted lines in the horizontal direction) indicate an amount Su of data in sectors, as in the case of FIGS. 5 and 8. A dotted line La in FIG. 10 corresponds to the cumulative data amount La of audio data A stored in the memory 18, the cumulative data amount La being indicated by the solid line in FIG. 5 illustrated above. A dotted line Lv indicates a cumulative data amount Lv of video data V stored in the memory 18, the cumulative data amount Lv being indicated by the solid line in FIG. 8 illustrated above. A dotted line Lm indicates a cumulative data amount Lm of frame metadata stored in the memory 18, the cumulative data amount Lm being indicated by a solid line in FIG. 12 illustrated below.

In FIG. 10, for example, for $N_l=1$, the data amount of low-resolution data required for reproduction for time $T_{si} \times N_l$ (=1) is LN1'. Thus, for $N_l=1$ in step S64, when low-resolution data having the cumulative data amount LN1' is stored in the memory 18, it is determined that low-resolution data corresponding to reproduction time $T_{si} \times N_l$ is stored in the memory 18 and the process proceeds to step S65.

In step S65, the control unit 20 controls the memory controller 17 to perform extraction by reading low-resolution data, on a first-in first-out basis, from low-resolution data stored in the memory 18. In this case, the read low-resolution data has an amount of data that is a maximum amount of data readable from the memory 18 and that is an integral multiple (n times) of the amount Su of data in, for example, one sector, which is a physical record/reproduction unit (a physical unit area) formed on the optical disc 11. The process then proceeds to step S66. Low-resolution annulus data that is read from the memory 18, as low-resolution data having an amount of data that is an integral multiple of data in the sector and that is a maximum amount of data readable from the memory 18, corresponds to the latest low-resolution annulus data prior to reproduction time $T_{si} \times N_l$ described above.

In this case, when time is $1 \times T_{si}$ in FIG. 10, low-resolution data having an at least data amount LN1' is stored in the memory 18. The data amount LN1' is more than the amount of data for one sector but is less than the amount of data for two sectors. Thus, in step S65, low-resolution data having a data amount LN1, which is equal to the amount Su of data for one sector, is read and extracted from the memory 18 as low-resolution annulus data of interest.

Low-resolution data that has not been read in step S65, i.e., low-resolution data having a data amount Lα1 that is less than the amount Su of data for one sector is left unchanged in the memory 18, when time in FIG. 10 is $1 \times T_{si}$.

Referring back to FIG. 9, in step S66, the control unit 20 causes the memory controller 17 to supply the low-resolution annulus data of interest which has been obtained in step S65 and which has an amount of data that is an integral multiple of data in the sector to the signal processor 16. By doing so, the control unit 20 controls recording so that the low-resolution annulus data of interest having an amount of data that is an integral multiple of data in the sector is recorded in a number of sectors which is equal to the integral multiple. As a result, low-resolution annulus data having an amount of data that is an integral multiple of data in a sector is periodically stored in a number of sectors which is equal to the integral multiple so that the boundaries of the low-resolution annulus data match the boundaries of the sectors of the optical disk 11. Low-resolution annulus data are also arranged and recorded at a position adjacent to audio annulus data and video annulus data which have a similar reproduction time-frame.

Subsequently, the process proceeds to step S67, in which the control unit 20 increments variable $N_l$ by 1. The process then returns to step S62 and the subsequent processing is repeated.

Thus, in the embodiment shown in FIG. 10, when time t is at $T_{sl}$ and $2 \times T_{sl}$, low-resolution data for one sector and low-resolution data for three sectors are extracted as low-resolution annulus data #1 and #2, respectively, and are recorded so as to match boundaries on the disk 11.

On the other hand, in step S63, when it is determined that low-resolution data has not been supplied to the memory 18, i.e., when the supply of low-resolution data from the data converter 19 to the memory controller 17 stops, the process proceeds to step S68. In step S68, the control unit 20 controls the memory controller 17 to read all low-resolution data currently left in the memory 18 and to add padding data for padding to the low-resolution data so that the amount of read data becomes a minimum amount of data that is an integral multiple of data in the sector. As a result, low-resolution data read from the memory 18 becomes low-resolution annulus data having an amount of data that is an integral multiple of data in the sector. By causing the low-resolution annulus data to be supplied from the memory controller 17 to the signal processor 16, the control unit 20 controls recording so that low-resolution annulus data having an amount of data that is an integral multiple of data in the sector is recorded in a number of sectors which is equal to the integral multiple.

Thereafter, the process proceeds to step S69, in which the control unit 20 sets variable $N_l$ to a value corresponding to an infinite value, and the low-resolution data recording task ends.

As a result, low-resolution annulus data having an amount of data that is an integral multiple of data of, for example, a sector, which is the physical unit area of the optical disk 11, is periodically stored in a number of sectors which is equal to the integral multiple so that the boundaries of the low-resolution annulus data match the boundaries of the sectors of the optical disk 11.

The frame-metadata recording task started in step S6 shown in FIG. 3 will now be described with reference to a flow chart shown in FIG. 11.

When the frame-metadata recording task is started, first, in step S81, the control unit 20 initializes variable $N_m$, which is incremented by "1" in step S87 executed below, to, for example, "1", and the process proceeds to step S82.

In step S82, the control unit 20 determines whether $T_{sm} \times N_m$ is less than $T_{sa} \times N_a$, and further determines whether $T_{sm} \times N_m$ is less than $T_{sv} \times N_v$ and is less than $T_{sl} \times N_l$.

In this case, when frame-meta annulus data to be recorded is referred to as "frame-meta annulus data of interest", the frame-meta annulus data of interest becomes frame-meta annulus data for the latest reproduction time-frame prior to reproduction time $T_{sm} \times N_m$. The frame-meta annulus data of interest needs to be recorded at a position immediately after audio annulus data, video annulus data, and low-resolution annulus data for the latest reproduction time-frame prior to reproduction time $T_{sm} \times N_m$.

Thus, in step S82, a determination is made as to whether reproduction time $T_{sm} \times N_m$ of frame-meta annulus data is less than reproduction time $T_{sa} \times N_a$ of audio annulus data, is less than reproduction time $T_{sv} \times N_v$ of video annulus data, and is less than reproduction time $T_{sl} \times N_l$ of low-resolution annulus data. As a result, it is determined whether or not the current timing is timing at which the frame-meta annulus data of interest is to be recorded.

When it is determined in step S82 that reproduction time $T_{sm} \times N_m$ of frame-meta annulus data is less than any of reproduction time $T_{sa} \times N_a$ of audio annulus data, reproduction time $T_{sv} \times N_v$ of video annulus data, and reproduction time $T_{sl} \times N_l$ of low-resolution annulus data, i.e., when it is determined that the current timing is timing at which the frame-meta annulus data of interest is not to be recorded, the process returns to step S82 and then the same processing is repeated.

When it is determined in step S82 that reproduction time $T_{sm} \times N_m$ of frame-meta annulus data is less than reproduction time $T_{sa} \times N_a$ of audio annulus data, is less than reproduction time $T_{sv} \times N_v$ of video annulus data, and is less than reproduction time $T_{sl} \times N_l$ of low-resolution annulus data, i.e., when it is determined that the current timing is timing at which the frame-meta annulus data of interest is to be recorded, the process proceeds to step S83. In step S83, the control unit 20 determines whether or not frame metadata is supplied from the data converter 19 to the memory 18 via the memory controller 17. When it is determined that frame metadata is supplied, the process proceeds to step S84.

In step S84, the control unit 20 determines whether or not frame metadata having a cumulative amount of data required for reproduction for frame-meta annulus size $T_{sm} \times N_m$ has been stored in the memory 18. When it is determined that frame metadata therefor has not been stored in the memory 18 yet, the process returns to step S82 and then the same processing is repeated. When it is determined in step S84 that frame metadata corresponding to reproduction time $T_{sm} \times N_m$ has been stored in the memory 18, the process proceeds to step S85.

When the data-amount detector 42 in the data converter 19 detects a cumulative amount of video signal and audio signal required for reproduction for reproduction time $T_{sm} \times N_m$, the data-amount detector 42 issues a notification indicating the detected result to the memory controller 17. In accordance with the notification, the memory controller 17 determines whether or not frame metadata having a cumulative amount of data required for reproduction for reproduction time $T_{sm} \times N_m$ has been stored in the memory 18 and issues a notification indicating the determination result to the control unit 20. That is, the control unit 20 performs the determination in step S84, in accordance with the determination result issued from the memory controller 17.

FIG. 12 shows a cumulative amount of data (cumulative data amount) Lm of frame metadata stored in the memory 18 versus time (reproduction time). Small arrows indicating the vertical direction shown at the right hand side in FIG. 12 (i.e., arrows indicating the spacing of dotted lines in the horizontal direction) indicate an amount Su of data in sectors, as in the case of FIGS. 5, 8, and 10. A dotted line La in FIG. 12 corresponds to the cumulative data amount La of audio data A stored in the memory 18, the cumulative data amount La being indicated by the solid line in FIG. 5 illustrated above. A dotted line Lv indicates a cumulative data amount Lv of video data V stored in the memory 18, the cumulative data amount Lv being indicated by the solid line in FIG. 8 illustrated above. A dotted line Ll indicates a cumulative data amount Ll of low-resolution data stored in the memory 18, the cumulative data amount Ll being indicated by the solid line in FIG. 10 illustrated above.

In FIG. 12, for example, for $N_m=1$, the data amount of frame metadata required for reproduction for time $T_{sm} \times N_m$ (=1) is MN1'. Thus, for $N_m=1$ in step S84, when frame metadata having the cumulative data amount MN1' is stored in the memory 18, it is determined that frame metadata corresponding to reproduction time $T_{sm} \times N_m$ is stored in the memory 18 and the process proceeds to step S85.

In step S85, the control unit 20 controls the memory controller 17 to perform extraction by reading frame metadata, on a first-in first-out basis, from frame metadata in the memory 18. In this case, the read frame metadata has an amount of data that is a maximum amount of data readable from the memory 18 and that is an integral multiple (n times) of the amount Su of data in, for example, one sector, which is a physical record/ reproduction unit (a physical unit area) formed on the optical disc 11. The process then proceeds to step S86. Frame-meta annulus data that is read from the memory 18, as frame metadata having an amount of data that is an integral multiple of data in the sector and that is a maximum amount of data readable from the memory 18, corresponds to the above-noted latest frame-meta annulus data prior to reproduction time $T_{sm} \times N_m$.

In this case, when time is $1 \times T_{sm}$ in FIG. 12, frame metadata having an at least data amount MN1' is stored in the memory 18. The data amount MN1' is more than the amount of data for one sector but is less than the amount of data for two sectors. Thus, in step S85, frame metadata having a data amount MN1, which is equal to the amount Su of data for one sector, is read and extracted from the memory 18 as frame-meta annulus data of interest.

Frame metadata that has not been read in step S85, i.e., frame metadata having a data amount $M\alpha 1$ that is less than the amount Su of data for one sector is left unchanged in the memory 18, when time in FIG. 12 is $1 \times T_{sm}$.

Referring back to FIG. 11, in step S86, the control unit 20 causes the memory controller 17 to supply the frame-meta annulus data of interest which has been obtained in step S85 and which has an amount of data that is an integral multiple of data in the sector to the signal processor 16. By doing so, the control unit 20 controls recording so that the frame-meta annulus data of interest having an amount of data that is an integral multiple of data in the sector is recorded in a number of sectors which is equal to the integral multiple. As a result, frame-meta annulus data having an amount of data that is an integral multiple of data in a sector is periodically stored in a number of sectors which is equal to the integral multiple so that the boundaries of the frame-meta annulus data match the boundaries of the sectors of the optical disk 11. Frame-meta annulus data is also arranged and recorded at a position adjacent to audio annulus data, video annulus data, and low-resolution annulus data which have a similar reproduction time-frame.

Subsequently, the process proceeds to step S87, in which the control unit 20 increments variable $N_m$ by 1. The process then returns to step S82 and the subsequent processing is repeated.

Thus, in the embodiment shown in FIG. 12, when time t is at $T_{sm}$ and $2 \times T_{sm}$, frame metadata for one sector is extracted as frame-meta annulus data #1 and #2, respectively, and is recorded so as to match boundaries on the disk 11.

On the other hand, in step S83, when it is determined that frame metadata has not been supplied to the memory 18, i.e., when the supply of frame metadata from the data converter 19 to the memory controller 17 stops, the process proceeds to step S88. In step S88, the control unit 20 controls the memory controller 17 to read all frame metadata currently left in the memory 18 and to add padding data for padding to the frame metadata so that the amount of read data becomes a minimum amount of data that is an integral multiple of data in the sector. As a result, the frame metadata read from the memory 18 becomes frame-meta annulus data having an amount of data that is an integral multiple of data in the sector. Further, by causing the frame-meta annulus data to be supplied from the memory controller 17 to the signal processor 16, the control unit 20 controls recording so that frame-meta annulus data having an amount of data that is an integral multiple of data in the sector is recorded in a number of sectors which is equal to the integral multiple.

Thereafter, the process proceeds to step S89, in which the control unit 20 sets variable $N_m$ to a value corresponding to an infinite value, and the metadata recording task ends.

As a result, frame-meta annulus data having an amount of data that is an integral multiple of data of, for example, a sector, which is the physical unit area of the optical disk 11, is periodically stored in a number of sectors which is equal to the integral multiple so that the boundaries of the frame-meta annulus data match the boundaries of the sectors of the optical disk 11.

Figure 3:
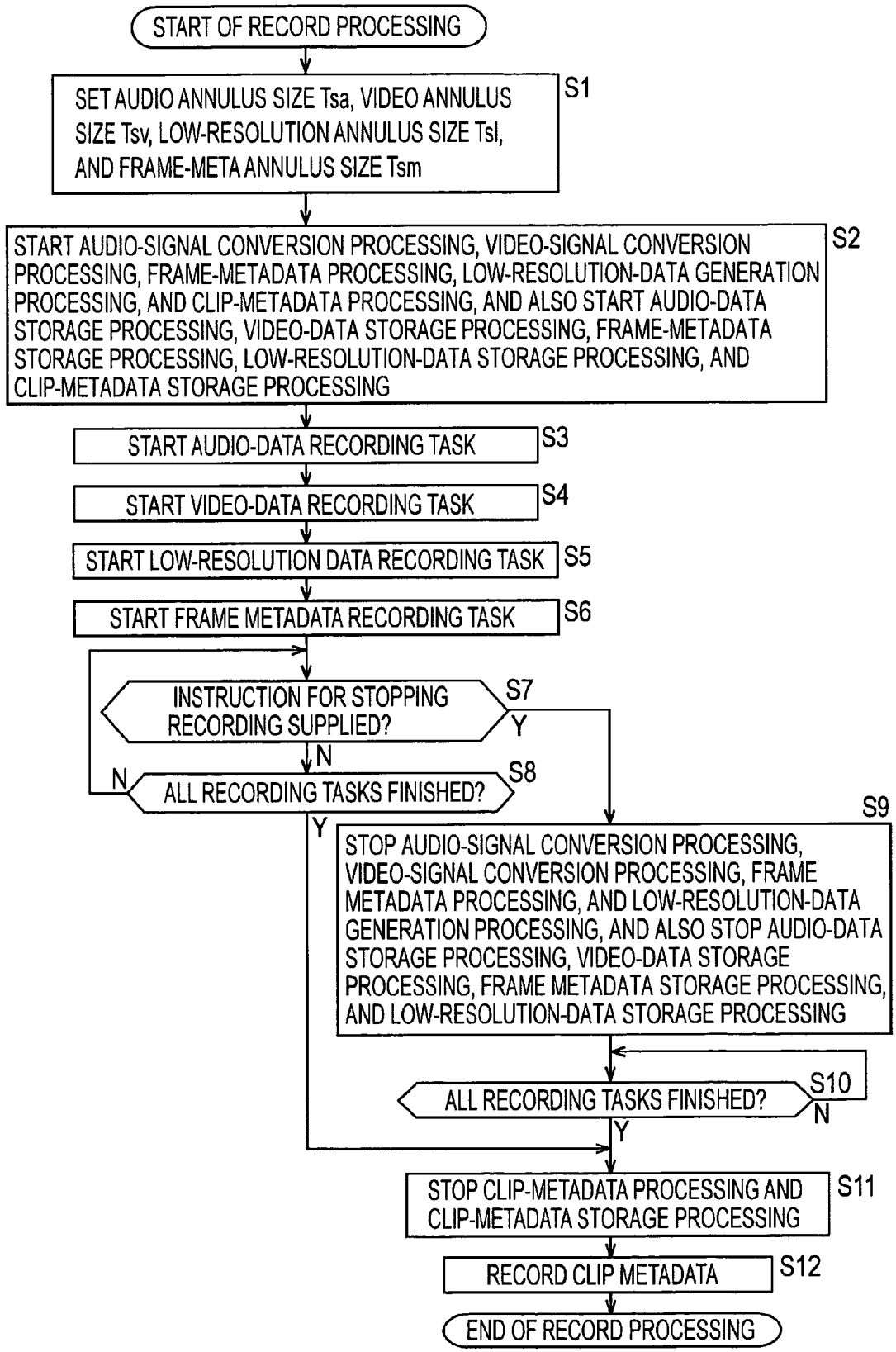
FIG. 3 is a flow chart illustrating recording processing performed by a control unit.

As a result of the record processing shown in FIG. 3, audio annulus data, video annulus data, low-resolution annulus data, and frame-meta annulus data which have a similar reproduction time-frame are periodically arranged and recorded on the optical disk 11 with the priority in the order of audio annulus data, video annulus data, low-resolution annulus data, and frame-meta annulus data. After those data are periodically recorded, clip-meta annulus data is arranged and recorded at random independently of those data. The priority for recording audio annulus data, video annulus data, low-resolution annulus data, and frame-meta annulus data are recorded onto the optical disk 11 is not limited to the above-described order of audio annulus data, video annulus data, low-resolution annulus data, and frame-meta annulus data.

Figure 4:
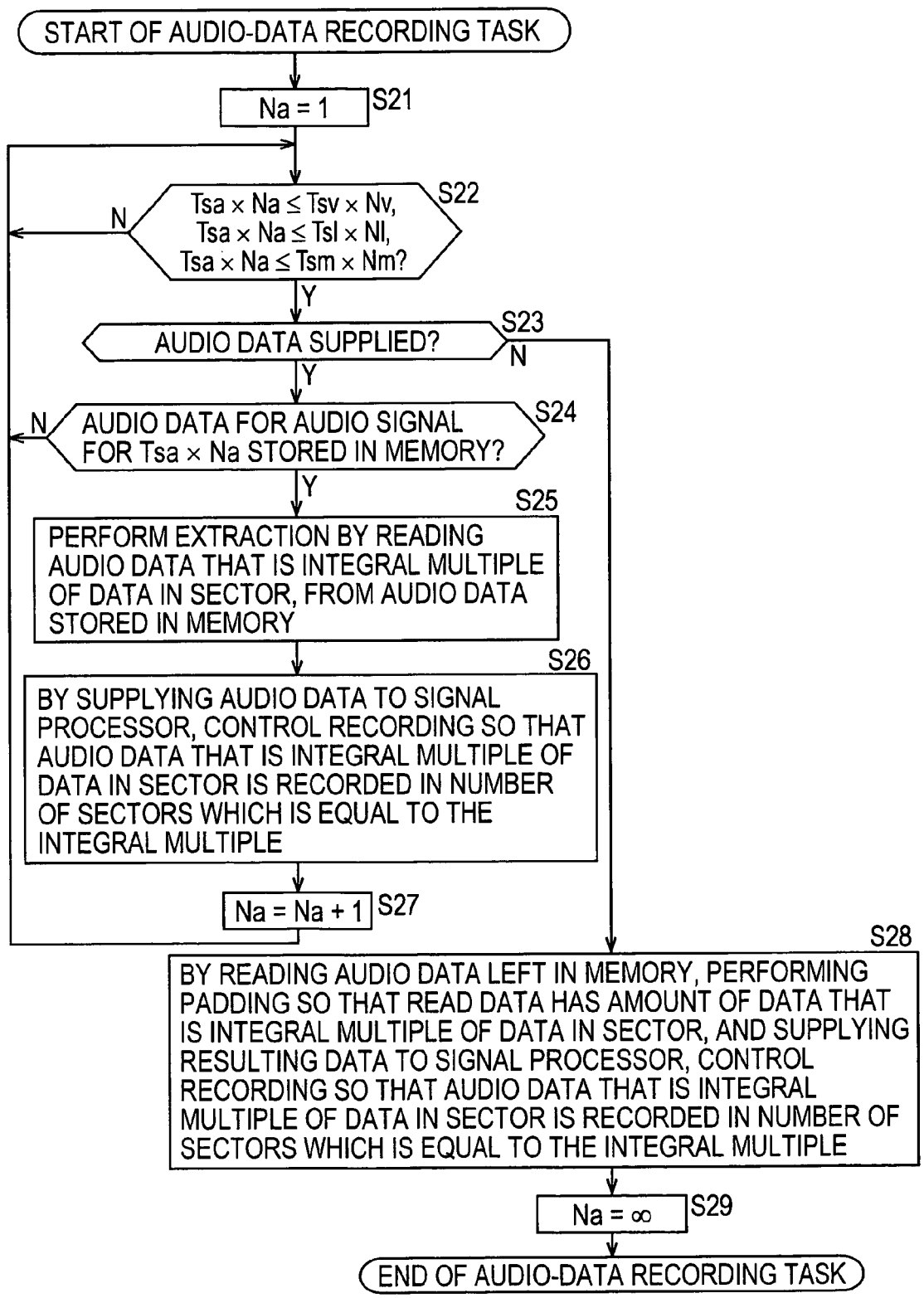
FIG. 4 is a flow chart illustrating an audio-data recording task.
Figure 7:
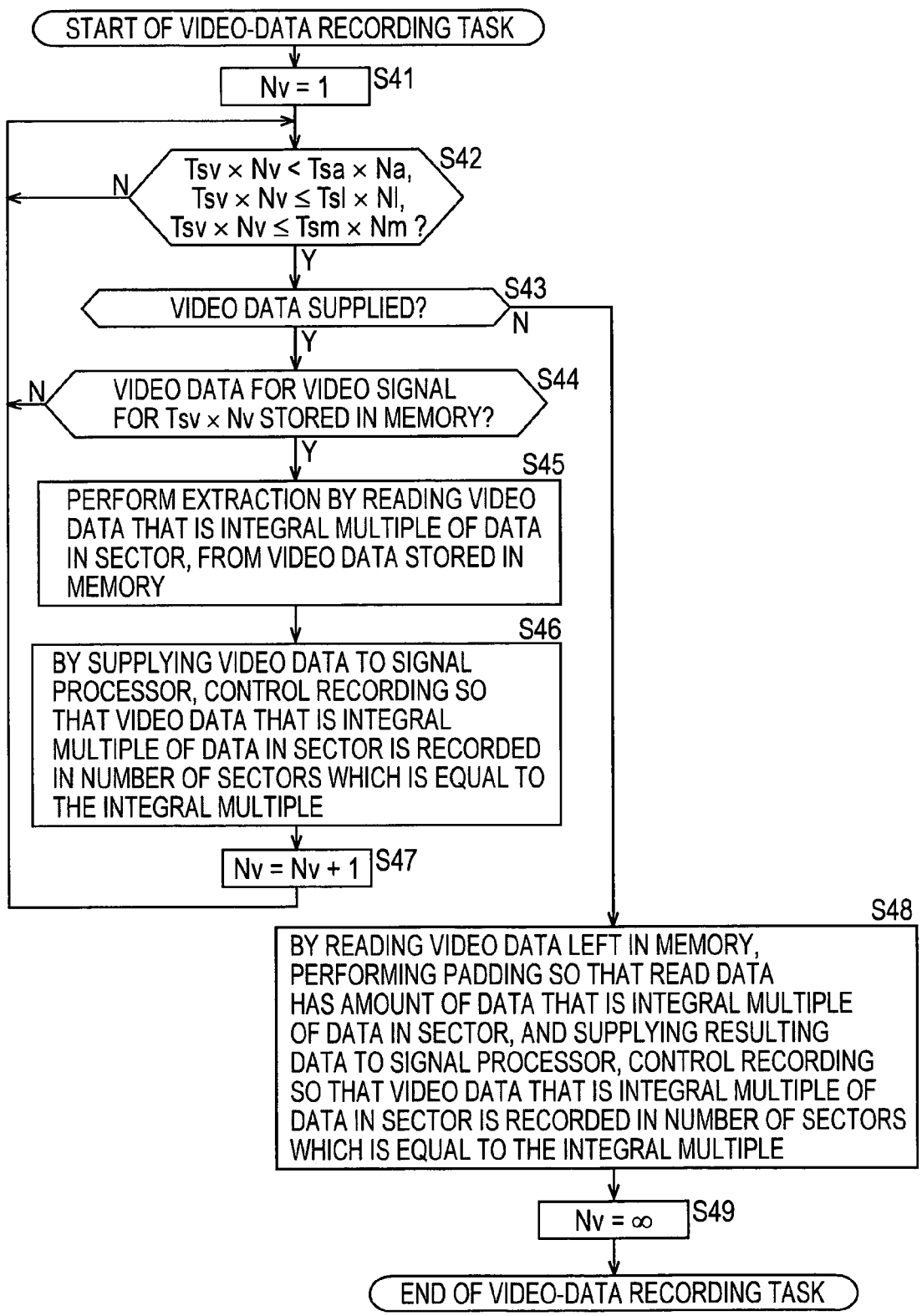
FIG. 7 is a flow chart illustrating a video-data recording task.
Figure 9:
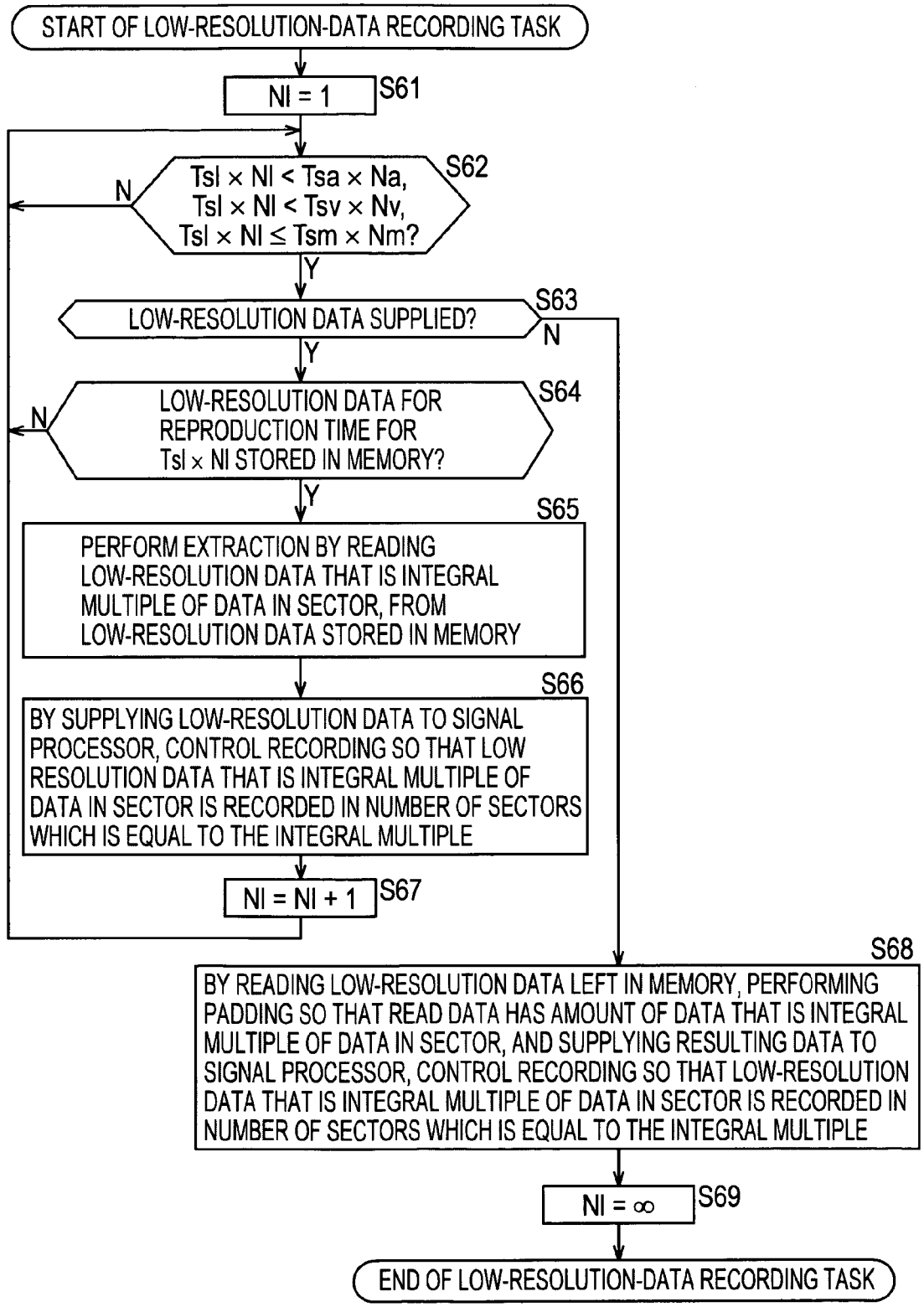
FIG. 9 is a flow chart illustrating a low-resolution data recording task.
Figure 11:
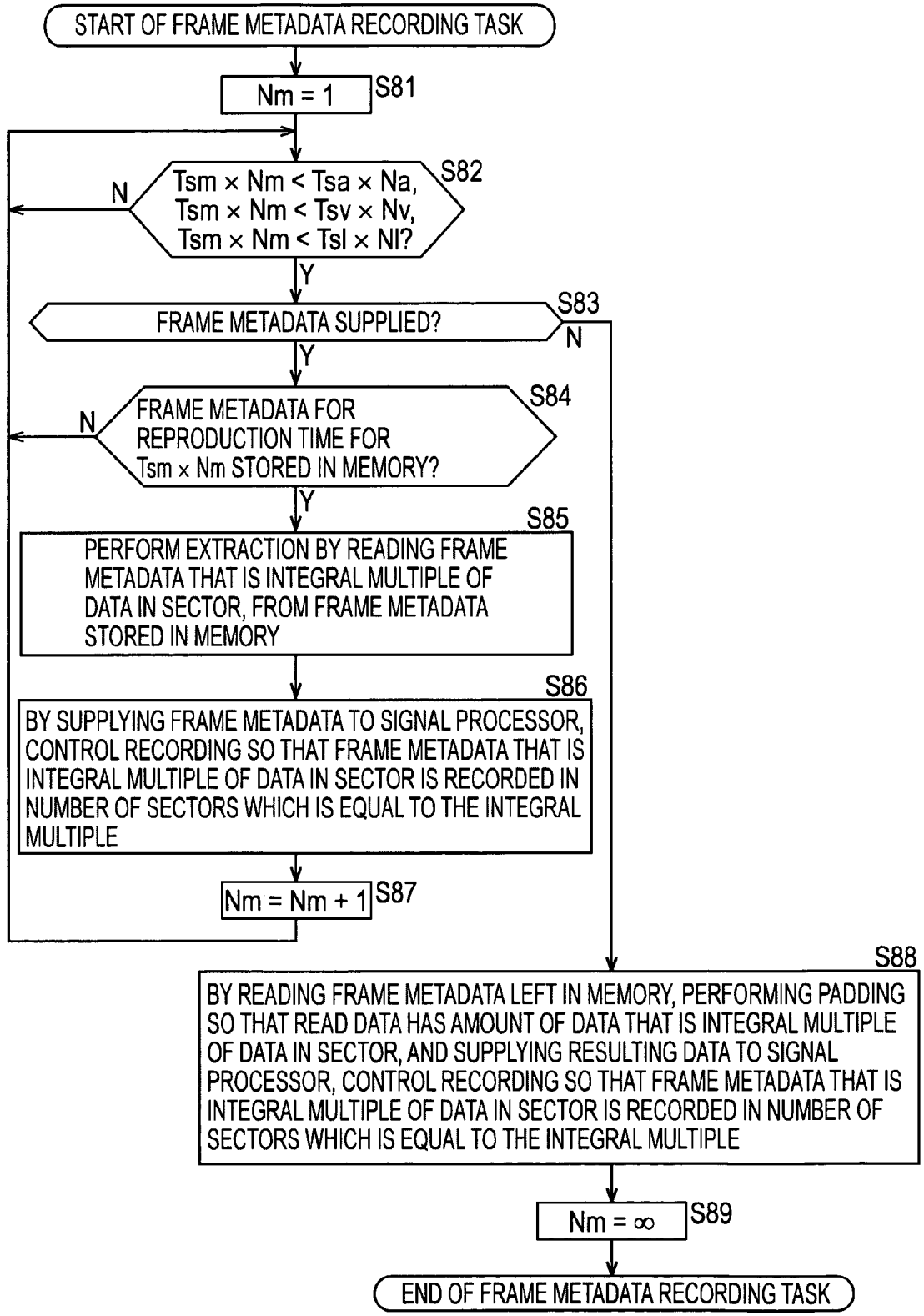
FIG. 11 is a flow chart illustrating a frame-metadata recording task.
Figure 13:
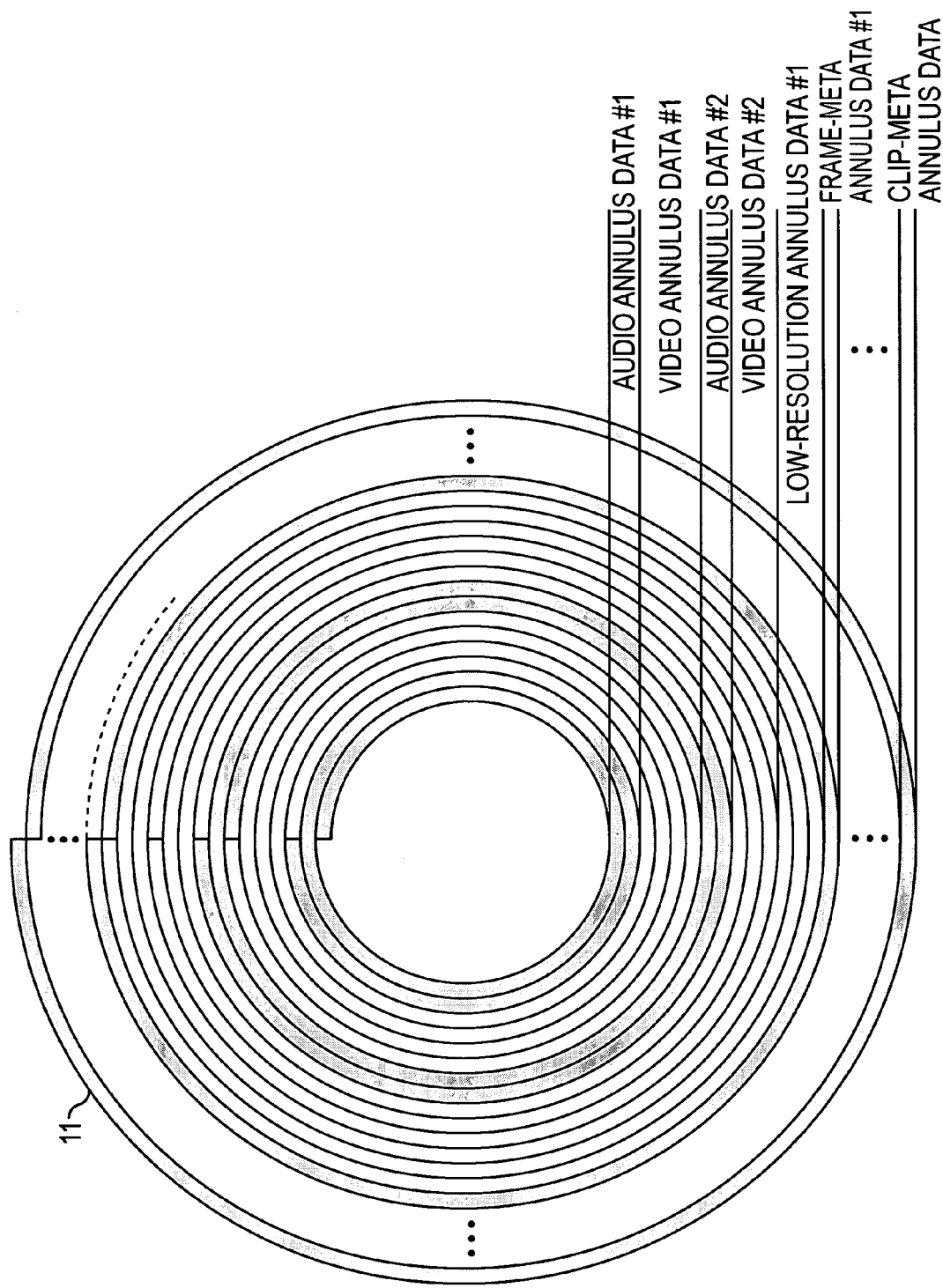
FIG. 13 is view showing a cumulative amount of data stored in the memory.

Now, with regard to audio annulus size $T_{sa}$ show in FIG. 5, video annulus size $T_{sv}$ shown in FIG. 8, low-resolution annulus size $T_{sl}$ shown in FIG. 10, and frame-meta annulus size $T_{sm}$ shown in FIG. 12, suppose there are relationships that, for example, image annulus size $T_{sv}$ is equal to audio annulus size $T_{sa}$, and low-resolution annulus size $T_{sl}$ and frame-meta annulus size $T_{sm}$ are equal to twice the size of audio annulus size $T_{sa}$ ($2 \times T_{sa} = 2 \times T_{sv} = T_{sl} = T_{sm}$) In this case, in the audio-data recording task shown in FIG. 4, the video-data recording task shown in FIG. 7, the low-resolution data recording task shown in FIG. 9, and the frame-metadata recording task shown in FIG. 11, audio annulus data #1 to #4 shown in FIG. 5, video annulus data #1 to #4 shown in FIG. 8, low-resolution annulus data #1 and #2 shown in FIG. 10, and frame-meta annulus data #1 and #2 shown in FIG. 12 are periodically recorded on the optical disk 11, as shown in FIG. 13. Clip-meta annulus data is arranged and recorded at random (in this case, at the outer-circumference side of the audio annulus data, video annulus data, low-resolution annulus data, and frame-meta annulus data which are periodically recorded). In FIG. 13, portions where audio data, frame metadata, and clip metadata are recorded are indicated by shading and portions where video data and low-resolution data are recorded are indicated without any pattern.

In the example of FIG. 13, audio annulus data #1, video annulus data #1, audio annulus data #2, video annulus data #2, low-resolution annulus data #1, frame-meta annulus data #1, audio-annulus data #3, video annulus data #3, audio annulus data #4, video annulus data #4, low-resolution annulus data #2, frame-meta annulus data #2 . . . and so on are periodically recorded in that order from the inner circumference side toward the outer circumference side of the optical disk 11. After all of audio annulus data, video annulus data, low-resolution annulus data, and frame-meta annulus data are recorded, clip-meta annulus data is arranged and recorded at random.

As described above, audio annulus data, video annulus data, low-resolution annulus data, and frame-meta annulus data which have a similar reproduction time-frame are recorded at close positions on the optical disk 11. As a result, audio data, video data, low-resolution data, frame metadata which have the same reproduction time can be promptly read and reproduced from the optical disk 11.

Although it was assumed that video annulus size $T_{sv}$ is equal to audio annulus size $T_{sa}$ and low-resolution annulus size $T_{sl}$ and frame-meta annulus size $T_{sm}$ are twice the size of audio annulus size $T_{sa}$, the relationships of audio annulus size $T_{sa}$, video annulus size $T_{sv}$, low-resolution annulus size $T_{sl}$, and frame-meta annulus size $T_{sm}$ are not limited thereto. For example, all of them can have the same time or can have different times one another.

Further, audio annulus size $T_{sa}$, video annulus size $T_{sv}$, low-resolution annulus size $T_{sl}$, and frame-meta annulus size $T_{sm}$ can be set in accordance with the application or use of the optical disk 11.

That is, for example, low-resolution annulus size $T_{sl}$ and frame-meta annulus size $T_{sm}$ can be larger than audio annulus size $T_{sa}$ and video annulus size $T_{sv}$. For example, when frame-meta annulus size $T_s$ is configured to be larger than audio annulus size $T_{sa}$ and video annulus size $T_{sv}$ (e.g., when frame-meta annulus size $T_{sm}$ is 20 seconds whereas audio annulus size $T_{sa}$ and video annulus size $T_{sv}$ are 2 seconds), only frame data can be read from the optical disk 11 in a short period of time. Thus, for example, through the use of time code contained in the frame metadata, a specific frame of a video signal that is mainstream data can be retrieved at a high speed. An increase in frame-meta annulus size $T_{sm}$ allows a reduction in time required for reading (and also time required for writing) a series of specific data, such as only frame metadata.

Similarly, when low-resolution annulus size $T_{sl}$ is configured to be larger than audio annulus size $T_{sa}$ and video annulus size $T_{sv}$ (e.g., when low-resolution annulus size $T_{sl}$ is 10 seconds whereas audio annulus size $T_{sa}$ and video annulus size $T_{sv}$ are 2 seconds), for example, it is possible to increase a shuttle reproduction speed using low-resolution data and the transfer speed of low-resolution data to an external apparatus, such as a computer.

Thus, frame-meta annulus size $T_s$ may be increased for a case in which a high-speed characteristic is required for retrieving a frame or low-resolution annulus size $T_{sl}$ may be increased for a case in which the shuttle reproduction of low-resolution data or high-speed transfer to the outside is required. Such an arrangement can provide an optical disk 11 that is highly convenient and that meets those requirements.

In the above, after the series of recording tasks (i.e., the audio-data recording task shown in FIG. 4, the video-data recording task shown in FIG. 7, the low-resolution data recording task shown in FIG. 9, and the frame-metadata recording task shown in FIG. 11) is finished, clip metadata is recorded. The present invention, however, is not limited to the arrangement. For example, the recording timing is not particularly limited, including time when an instruction for starting the next record processing (FIG. 3) is issued, time when the optical disk 11 is ejected, or time after a predetermined time has elapsed.

Figure 14A:
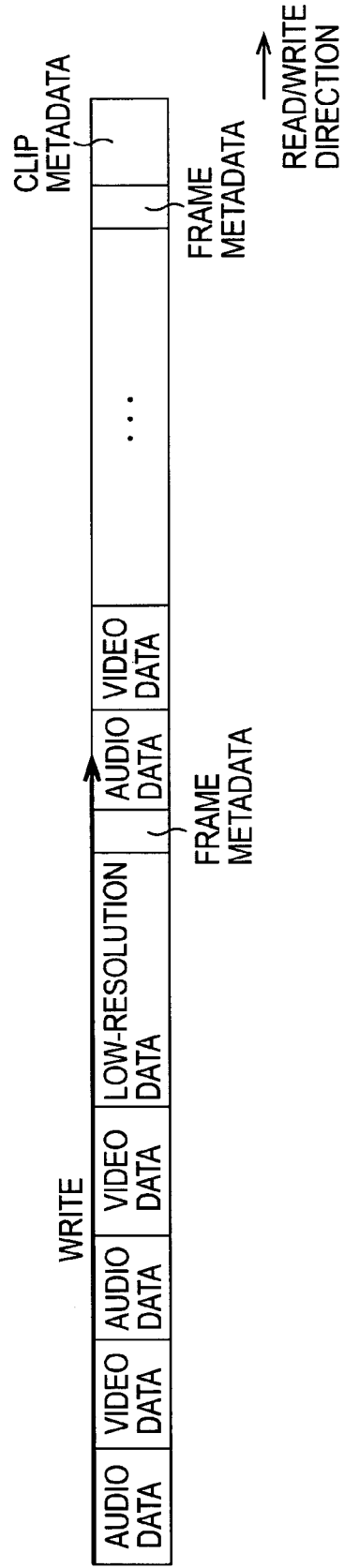
FIG. 14A is a diagram showing a state in which data is recorded to the optical disk.
Figure 14B:
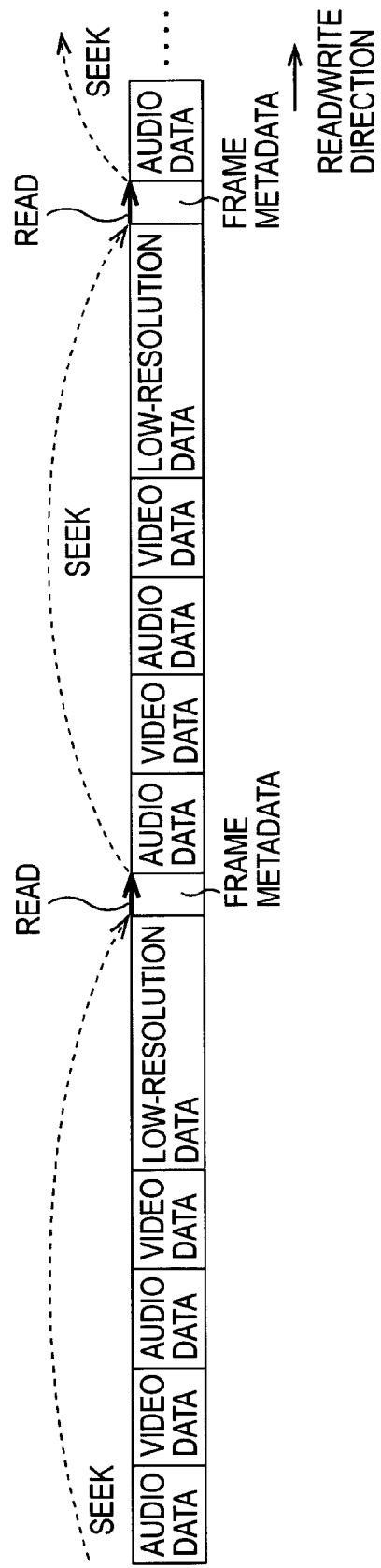
FIG. 14B is a diagram showing a state in which frame metadata is read from the optical disk.

Next, FIGS. 14A and 14B show states in which the disk recording/reproducing apparatus 10 writes and reads data to and from the optical disk 11, respectively. In FIGS. 14A and 14B, five data series, i.e., audio data, video data, low-resolution data, frame metadata, and clip metadata, are written to and read from the optical disk 11.

It is assumed that the optical disk 11 has a continuous free space having a sufficient capacity and the free space has no defect (defect). In this case, when data is written to the optical disk 11, audio annulus data, video annulus data, low-resolution annulus data, and frame-meta annulus data which are extracted from corresponding data series of audio data, video data, low-resolution data, and frame metadata are written to the free space on the optical disk 11, just like writing with one stroke, as shown in FIG. 14A. The audio annulus data, video annulus data, low-resolution annulus data, and frame-meta annulus data each have an amount of data that is an integral multiple of data in a sector of the optical disk 11 and are each recorded so that the boundaries of the data match the boundaries of sectors. When writing of the last frame-meta annulus data is completed, clip-meta annulus data extracted from the data series of clip metadata is written.

On the other hand, when a specific data series is read from the optical disk 11, as shown in FIG. 14B, a seek operation is performed to a recording position of data of the data series, so that only the data is repeatedly read. FIG. 14B shows a state in which only frame metadata is read.

As described above, audio annulus data, video annulus data, low-resolution annulus data, and meta annulus data each have an amount of data that is an integral multiple of data in a sector of the optical disk 11 and are further recorded so that the boundaries of the data match the boundaries of sectors. Thus, only any specific data of audio annulus data, video annulus data, low-resolution annulus data, and frame-meta annulus data is required, only the specific data can be read without reading other data.

In this embodiment, frame metadata is adapted to be periodically recorded on the optical disk 11 together with material data. This arrangement can reduce the occurrence of a seek operation during reading of the data and can reproduce the data at a high speed. Further, clip metadata, including components such as discontinuous-point time code, is adapted to be recorded, for example, at the outer circumference side of the optical disk 11 in a contiguous manner. This arrangement allows a reduction in the reading time of the data and allows a high-speed retrieval of a specific frame.

Figure 15A:
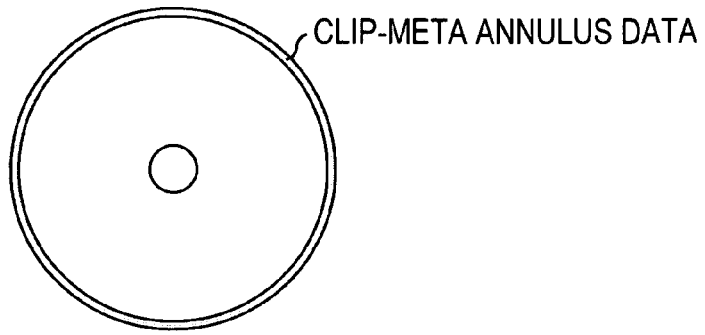
FIG. 15A is a view showing a state in which clip-meta annulus data is recorded to one area at the outer circumference side of the optical disk.
Figure 15B:
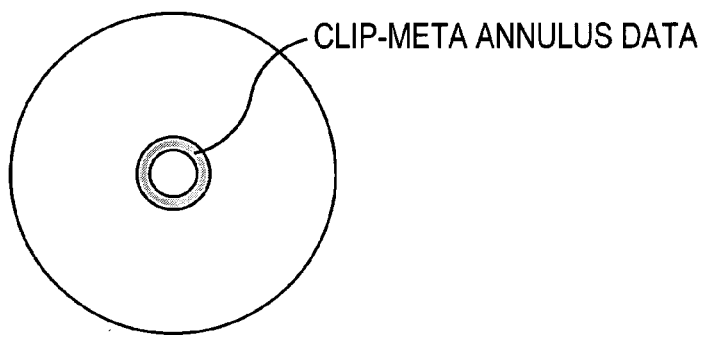
FIG. 15B is a view showing a state in which clip-meta annulus data is recorded to one area at the inner circumference side of the optical disk.
Figure 15C:
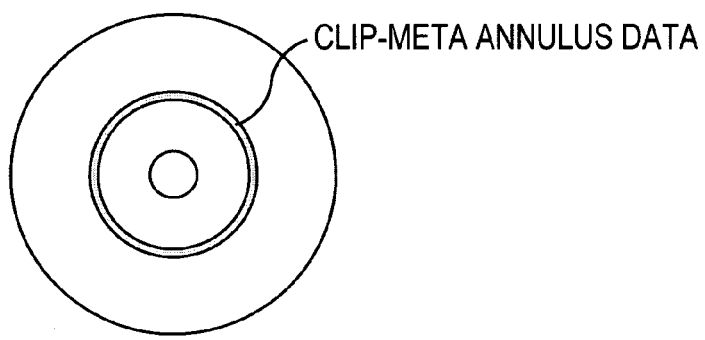
FIG. 15C is a view showing a state in which clip-meta annulus data is recorded to a specific area of the optical disk.
Figure 15D:
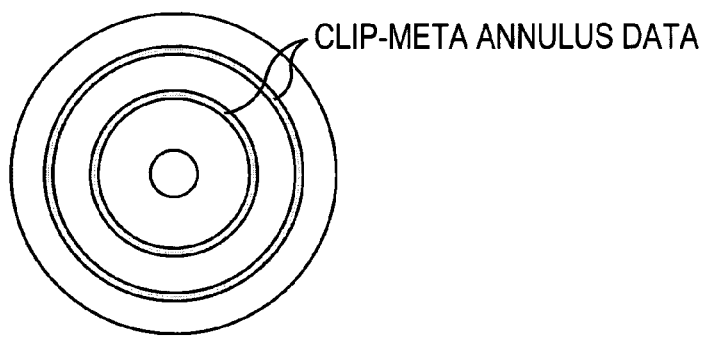
FIG. 15D is a view showing a state in which clip-meta annulus data is recorded to a plurality of specific areas of the optical disk.

Although the above description has been given of a case in which clip-meta annulus data is recorded at the outer circumference side of the optical disk 11 in a contiguous manner, as shown in FIG. 15A, the present invention is not limited thereto. Clip-meta annulus data can be recorded at the inner circumference side in a contiguous manner, as shown in FIG. 15B, or can be recorded as at a specific area in a contiguous manner, as shown in FIG. 15C. Alternatively, clip-meta annulus data can be separately recorded in a plurality of specific areas, as shown in FIG. 15D. Clip metadata may further be contained in a specific frame-meta annulus data.

The present invention is not limited to optical disks, but is widely applicable to, for example, magneto-optical disks, such as MOs (magneto-optical disks); magnetic disks, such as flexible disks; magnetic tapes, such as digital-VTR-format videotapes; and nonlinear accessible storage media, such as various types of RAMs, ROMs, and semiconductor memories.

The above-described series of processing can also be realized with hardware or can be realized with software. When the series of processing is realized with software, a program that implements the software is installed on a computer and the program is executed by the computer to thereby realize the features of the disk recording/reproducing apparatus 10 described above.

Figure 16:
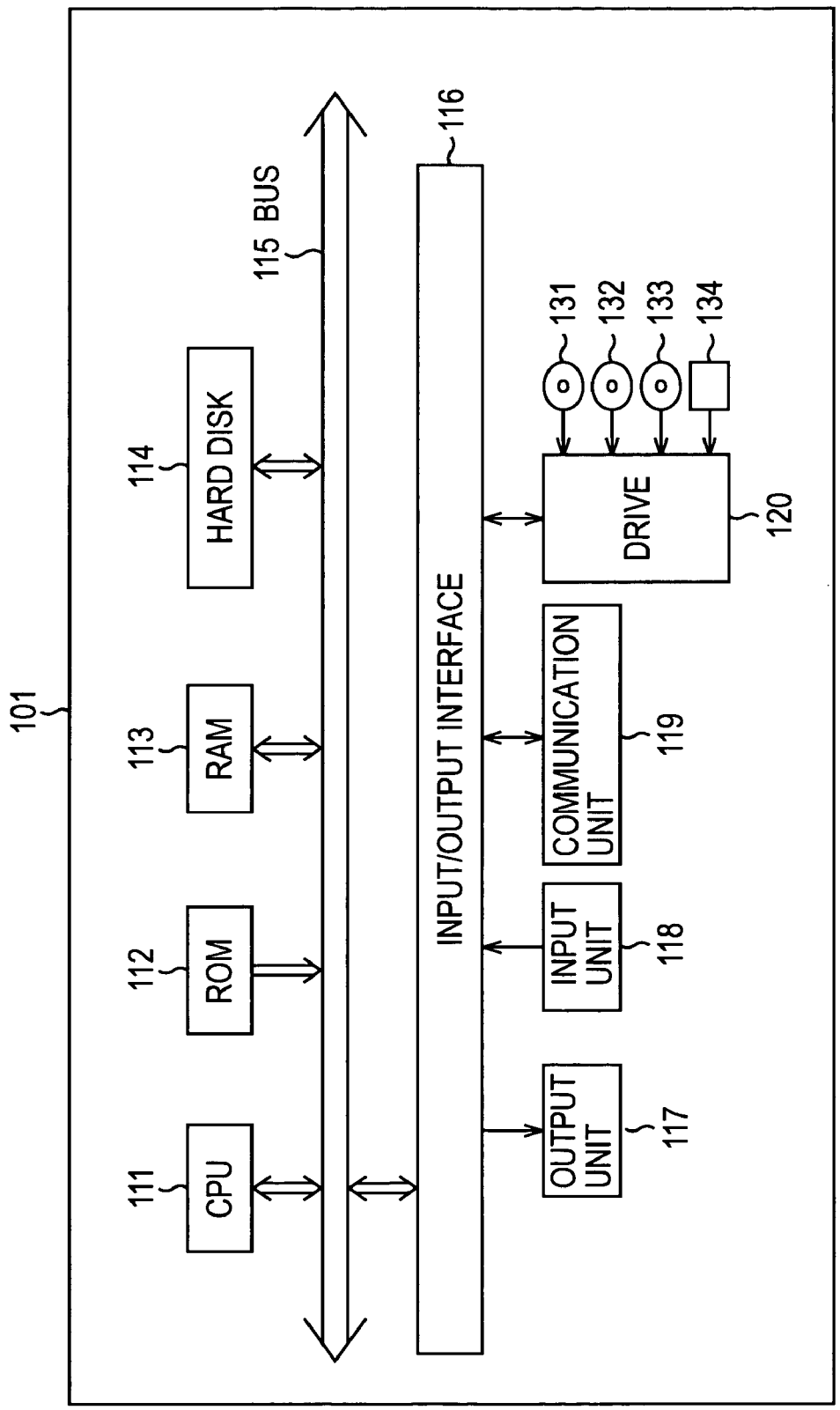
FIG. 16 is a block diagram showing an exemplary configuration of a persona computer 101.

FIG. 16 is a block diagram showing the configuration of one embodiment of a computer 101 that functions as the disk recording/reproducing apparatus 10 described above. An input/out interface 116 is connected to a CPU (central processing unit) 111 via a bus 115. An instruction is entered by a user through an input unit 118, including a keyboard, a mouse, and so on. Upon receiving the instruction via the input/output interface 116, the CPU 111 loads a program, which is stored in a storage medium, into a RAM 113 and executes the program, thereby performing the various processing described above. An example of the storage medium is a magnetic disk 131, an optical disk 132, a magneto-optical disk 133, or a semiconductor memory 134, each of which is connected to a ROM 112, a hard disk 114, or a drive 120. In addition, the CPU 111 outputs, for example, the result of the processing to an output unit 117, which includes an LCD (liquid crystal display), via the input/output interface 116, as needed. The program is pre-stored in the hard disk 114 or the ROM 112 so that the program can be supplied to a user together with the computer 101. The program can also be supplied as package media, such as the magnetic disk 131, the optical disk 132, the magneto-optical disk 133, and the semiconductor memory 134. Further, the program can be supplied to the hard disk 114 from a satellite, a network, or the like via a communication unit 119.

Herein, steps for writing the program not only include processing that is time-sequentially performed according to the order described in the above-described flow charts but also include processing that is not necessarily performed time-sequentially but is executed in parallel or independently.

INDUSTRIAL APPLICABILITY

As described above, according to the present invention, it is possible to improve the convenience of a storage medium. In particular, it is possible to achieve high-speed reproduction and high-speed retrieval.

The invention claimed is:

1. A recording control apparatus for controlling recording of first, second, and third data series onto an optical disk, the apparatus comprising:
    first data extracting means for extracting video and audio data having a first data amount for each frame from the first data series, the first data amount being a data amount in accordance with a data amount required for reproduction of one frame of an image for a first reproduction time;
    second data extracting means for extracting frame metadata having a second data amount for each frame from the second data series, the second data amount being a data amount in accordance with a data amount required for reproduction of the frame metadata for a second reproduction time that is different from the first reproduction time;
    first recording-control means for performing recording-control to record data having the first data amount for the first data series and data having the second data amount for the second data series onto the optical disk so that frame metadata for each frame is recorded physically adjacent the video and audio data recorded for each frame, wherein the video and audio data and frame metadata which have a same reproduction time are periodically arranged at close positions in a circumferential direction of the optical disk in a form of annular rings respectively; and
    second recording-control means for performing recording-control to record the third data series onto the optical disk only after all first and second data series are finished being recorded on the optical disk in the form of annular rings by the first recording control means so that the third data series is physically arranged on the optical disk independently of the periodically arranged first data series and the second data series, wherein the third data series is separately recorded at an inner circumference side in a contiguous manner and wherein the third data series is clip metadata recorded for each clip.

2. The recording control apparatus according to claim 1, wherein the first data amount is a data amount that is an integral multiple of a data amount in a physical unit area of the optical disk and that is close to a data amount required for reproduction for the first reproduction time, and
    the second data amount is a data amount that is an integral multiple of a data amount in the physical unit area of the optical disk and that is close to a data amount required for reproduction for the second reproduction time.

3. The recording control apparatus according to claim 2, wherein, with respect to the optical disk, the physical unit area is a minimum area to/from which data writing/reading is performed or an area in which an ECC (error correcting code) block on which ECC processing is performed is recorded.

4. The recording control apparatus according to claim 1, wherein the first recording-control means causes the data having the first data amount for the first data series and the data having the second data amount for the second data series to be recorded onto the optical disk so that boundaries of the respective data match boundaries of physical unit areas of the optical disk.

5. The recording control apparatus according to claim 4, wherein, with respect to the optical disk, the physical unit area is a minimum area to/from which data writing/reading is performed or an area in which an ECC (error correcting code) block on which ECC processing is performed is recorded.

6. The recording control apparatus according to claim 1, wherein the first data series is a data series of video or a data series of audio associated with the video;
    the second data series is a data series of the frame metadata that requires a real-time characteristic for the data series of video or the data series of audio associated with the video; and
    the third data series is a data series of the clip metadata that does not require a real-time characteristic for the data series of video or the data series of audio associated with the video.

7. The recording control apparatus according to claim 1, wherein, for each clip that constitutes material data in a predetermined area in the first data series, the third data series uses one file containing one of at least an LTC/UMID, GPS data, front-end time code, discontinuous-point time code information, a front-end extended UMID source pack, and a discontinuous-point extended UMID source pack.

8. A recording control method for a recording control apparatus for controlling recording of first, second, and third data series onto an optical disk, the method comprising the steps of:
    a first data extracting step of extracting video and audio data having a first data amount for each frame from the first data series, the first data amount being a data amount in accordance with a data amount required for reproduction of one frame of an image for a first reproduction time;
    a second data extracting step of extracting frame metadata having a second data amount for each frame from the second data series, the second data amount being a data amount in accordance with a data amount required for reproduction of the frame metadata for a second reproduction time that is different from the first reproduction time;
    a first recording-control step of performing recording-control to record all data having the first data amount for the first data series and data having the second data amount for the second data series onto the optical disk so that the frame metadata for each frame is recorded physically adjacent the video and audio data recorded for each frame, wherein the video and audio data and frame metadata which have a same reproduction time are periodically arranged at close positions in a circumferential direction of the optical disk in a form of annular rings respectively; and a second recording-control step of performing recording-control to record the third data series onto the optical disk only after all first and second data series are finished being recorded on the optical disk in the form of annular rings so that the third data series is physically arranged on the optical disk independently of the periodically arranged first data series and the second data series, wherein the third data series is separately recorded in a contiguous manner and wherein the third data series is clip metadata recorded for each clip.

9. A computer program, encoded on a computer-readable non-transitory storage medium, for causing a computer to perform recording-control processing for controlling recording of first, second, and third data series onto an optical disk, the computer program comprising the steps of:

a first data extracting step of extracting video and audio data having a first data amount for each frame from the first data series, the first data amount being a data amount in accordance with a data amount required for reproduction of one frame of an image for a first reproduction time;

a second data extracting step of extracting frame metadata having a second data amount for each frame from the second data series, the second amount being a data amount in accordance with a data amount required for reproduction of the frame metadata for a second reproduction time that is different from the first reproduction time;

a first recording-control step of performing recording-control to record data having the first data amount for the first data series and data having the second data amount for the second data series onto the optical disk so that the frame metadata for each frame is recorded physically adjacent the video and audio data recorded for each frame, wherein the video and audio data and frame metadata which have a same reproduction time are periodically arranged at close positions in a circumferential direction of the optical disk in a form of annular rings respectively; and a second recording-control step of performing recording-control to record the third data series onto the optical disk only after all first and second data series are finished being recorded on the optical disk in the form of annular rings so that the third data series is physically arranged on the optical disk independently of the periodically arranged first data series and the second data series, wherein the third data series is separately recorded in a contiguous manner and wherein the third data series is clip metadata recorded for each clip.

10. A computer readable non-transitory storage medium encoded with a computer program for recording first, second, and third data series onto an optical disk, said computer program comprising the steps of:

(a) recording video and audio data which is extracted from the first data series and which has a first data amount for each frame that is a data amount in accordance with a data amount required for reproduction of one frame of an image for a first reproduction time; and (b) recording frame metadata which is extracted from the second data series and which has a second data amount for each frame that is a data amount in accordance with a data amount required for reproduction of the frame metadata for a second reproduction time that is different from the first reproduction time, wherein the frame metadata for each frame is recorded physically adjacent the video and audio data recorded for each frame and the video and audio data and frame metadata which have a same reproduction time data are periodically arranged at close positions in a circumferential direction of the optical disk in a form of annular rings respectively, and only after all first and second data series are finished being recorded on the optical disk in the form of annular rings, physically arranging the third data series at random on the optical disk independently of the periodically arranged first data series and the second data series, wherein the third data series is separately recorded in a contiguous manner and wherein the third data series is clip metadata recorded for each clip.

* * * * *